US010945261B2

(12) United States Patent
Wu et al.

(10) Patent No.: US 10,945,261 B2
(45) Date of Patent: *Mar. 9, 2021

(54) METHOD AND NETWORK DEVICE FOR CREATING AND DELETING RESOURCES

(71) Applicant: HUAWEI TECHNOLOGIES CO., LTD., Shenzhen (CN)

(72) Inventors: Wenfu Wu, Shanghai (CN); Shanshan Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 261 days.

This patent is subject to a terminal disclaimer.

(21) Appl. No.: 14/104,753

(22) Filed: Dec. 12, 2013

(65) Prior Publication Data

US 2014/0098791 A1    Apr. 10, 2014

Related U.S. Application Data

(63) Continuation of application No. 12/509,677, filed on Jul. 27, 2009, now Pat. No. 8,638,750, which is a (Continued)

(30) Foreign Application Priority Data

Jun. 22, 2007  (CN) .......................... 200710126555.0
Dec. 21, 2007  (CN) .......................... 200710159785.7

(51) Int. Cl.
*H04L 1/00* (2006.01)
*H04W 72/04* (2009.01)
(Continued)

(52) U.S. Cl.
CPC ......... *H04W 72/0433* (2013.01); *H04L 47/70* (2013.01); *H04L 47/80* (2013.01);
(Continued)

(58) Field of Classification Search
CPC ..... H04W 80/04; H04W 80/05; H04W 80/06; H04W 80/07; H04W 80/08
(Continued)

(56) References Cited

U.S. PATENT DOCUMENTS 6,246,874 B1  6/2001 Voce
7,079,499 B1  7/2006 Akhtar et al.
(Continued)

FOREIGN PATENT DOCUMENTS

CN  1505413 A  6/2004
CN  1878389 A  12/2006
(Continued)

OTHER PUBLICATIONS

3GPP TS 23.402 V1.0.0 May 2007.*
(Continued)

*Primary Examiner* — Dady Chery
(74) *Attorney, Agent, or Firm* — Huawei Technologies Co., Ltd.

(57) ABSTRACT

A method, device and system for creating resources during a user equipment (UE) hands over from a non-3$^{rd}$ Generation Partnership Project (non-3GPP) system to a 3GPP system are provided. A serving gateway (Serving GW) receives a first resource request message, such as Create Default Bearer Request message, including handover indication information indicating the handover from a mobility management network device, e.g., a MME. As the received resource request message includes the handover indication information, the Serving GW includes the handover indication information in a second resource request message and then sends the second resource request message to a PDN GW. After receiving the second resource request message, the PDN GW policy and charging control (PCC) rules to be
(Continued)

used by the UE in the 3GPP access system so as to create the resources used by the UE in the 3GPP system.

37 Claims, 12 Drawing Sheets

Related U.S. Application Data continuation of application No. PCT/CN2008/071400, filed on Jun. 20, 2008.

(51) Int. Cl.
| | | |
|---|---|---|
| *H04W 36/00* | (2009.01) | |
| *H04L 12/927* | (2013.01) | |
| *H04L 12/911* | (2013.01) | |
| *H04W 76/22* | (2018.01) | |
| *H04W 36/24* | (2009.01) | |
| *H04W 76/12* | (2018.01) | |
| *H04W 76/32* | (2018.01) | |
| *H04W 80/10* | (2009.01) | |

(52) U.S. Cl.
CPC ....... *H04L 47/824* (2013.01); *H04W 36/0066* (2013.01); *H04W 36/24* (2013.01); *H04W 76/22* (2018.02); *H04W 36/0016* (2013.01); *H04W 76/12* (2018.02); *H04W 76/32* (2018.02); *H04W 80/10* (2013.01)

(58) Field of Classification Search
USPC .......................... 370/328–334; 455/436–439; 709/227–229
See application file for complete search history.

(56) References Cited

U.S. PATENT DOCUMENTS

| | | | |
|---|---|---|---|
| 7,257,403 | B2 | 8/2007 | Nikkelen |
| 7,586,878 | B2 | 9/2009 | Hsu et al. |
| 7,764,660 | B2 | 7/2010 | Verma et al. |
| 7,969,931 | B2 | 6/2011 | Bachmann et al. |
| 8,200,222 | B2 | 6/2012 | Kim |
| 2002/0133600 | A1 | 9/2002 | Williams et al. |
| 2003/0114158 | A1 | 6/2003 | Soderbacka et al. |
| 2004/0242199 | A1 | 12/2004 | Edlund et al. |
| 2005/0130659 | A1 | 6/2005 | Grech et al. |
| 2006/0104262 | A1 | 5/2006 | Kant et al. |
| 2006/0126564 | A1 | 6/2006 | Ramanna et al. |
| 2006/0126565 | A1 | 6/2006 | Shaheen |
| 2006/0153124 | A1 | 7/2006 | Kant et al. |
| 2006/0187880 | A1 | 8/2006 | Choi |
| 2006/0221903 | A1 | 10/2006 | Kauranen et al. |
| 2006/0258356 | A1 | 11/2006 | Maxwell et al. |
| 2007/0019575 | A1 | 1/2007 | Shaheen |
| 2007/0032255 | A1 | 2/2007 | Koo et al. |
| 2007/0070958 | A1 | 3/2007 | Rinne et al. |
| 2007/0224990 | A1 | 9/2007 | Edge et al. |
| 2007/0281699 | A1 | 12/2007 | Rasanen |
| 2008/0089293 | A1 | 4/2008 | Madour et al. |
| 2008/0181178 | A1 | 7/2008 | Shaheen |
| 2008/0229385 | A1 | 9/2008 | Feder et al. |
| 2008/0316971 | A1 | 12/2008 | Shaheen |
| 2009/0129342 | A1 | 5/2009 | Hwang et al. |
| 2010/0037284 | A1 | 2/2010 | Sachs |
| 2010/0272061 | A1 | 10/2010 | Muhanna et al. |

FOREIGN PATENT DOCUMENTS

| | | |
|---|---|---|
| CN | 1893721 A | 1/2007 |
| CN | 1960311 A | 5/2007 |
| CN | 1960566 A | 5/2007 |
| CN | 1984021 A | 6/2007 |
| CN | 1984162 A | 6/2007 |
| CN | 101150838 A | 3/2008 |
| EP | 1684536 A1 | 7/2006 |
| JP | 2008-547354 A | 12/2008 |
| JP | 2009-503931 A | 1/2009 |
| JP | 2010-531118 A | 9/2010 |
| WO | WO 02/30146 A1 | 4/2002 |
| WO | WO 2006/012909 A1 | 2/2006 |
| WO | WO 2006/088331 A1 | 8/2006 |
| WO | WO 2007/006217 A1 | 1/2007 |
| WO | WO 2007/015795 A2 | 2/2007 |
| WO | WO 2007/024115 A1 | 3/2007 |
| WO | WO 2007/024116 A1 | 3/2007 |
| WO | WO 2007-036764 A1 | 4/2007 |
| WO | WO 2007/038947 A1 | 4/2007 |

OTHER PUBLICATIONS

Huawei, "Handover from non 3GPP to 3GPP" Agenda Item 8.4.3, 3GPP TSG SA WG2 Architecture—S2#56c Rel-8 Ad-hoc, Warsaw, Poland, Mar. 26-30, 2007, 4 pages.

GSM, "3$^{rd}$ Generation Partnership Project; Technical Specification Group Services and System Aspects; GPRS enhancements for E-UTRAN access" Release 8, 3GPP TS 23.401, V0.5.1, May 2007, 50 pages.

GSM, "3$^{rd}$ Generation Partnership Project; Technical Specification Group Services and System Aspects; Architecture Enhancements for non-3GPP accesses" (Release 8) 3GPP TS 23.402 v1.0.0, May 2007, 6 pages.

GSM, "3$^{rd}$ Generation Partnership Project; Technical Specification Group Services and System Aspects; General Packet Radio Service (GPRS); Service Description; Stage 2" (Release 7) 3GPP TS 23.060, V7.1.0, Jun. 2006, 213 pages.

GSM, "3$^{rd}$ Generation Partnership Project; Technical Specification Group Services and System Aspects; GPRS enhancements for E-UTRAN access" (Release 8) 3GPP TS 23.401, V1.0.0, May 2007, 50 pages.

GSM, "3$^{rd}$ Generation Partnership Project; Technical Specification Group Core Network and Terminals; Policy and Charging Control signalling flows and QoS parameter mapping" (Release 7) 3GPP TS 29.213, V7.0.0, Mar. 2007, 54 pages.

Chinese Patent No. 101330753, issued on Jul. 9, 2014, granted in corresponding Chinese Patent Application No. 200710159785.7. 42 pages.

GSM, "3$^{rd}$ Generation Partnership Project; Technical Specification Group Services and System Aspects; Architecture Enhancements for non-3GPP accesses" (Release 8) 3GPP TS 23.402, V1.1.0, Jun. 2007, 50 pages.

Nokia Siemens Networks, "PDN GW Selection for LTE and Non-3GPP Access," 3GPP TSG SA WG2 Architecture, 52#57, Beijing, China, S2-072182, Apr. 2007, 2 pages.

"3$^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 8)," 3GPP TS 23.401, V8.0.0, Dec. 2007, 167 pages.

"3$^{rd}$ Generation Partnership Project; Technical Specification Group Services and System Aspects; GPRS Enhancements for E-UTRAN Access (Release 8)," Global System for Mobile Communications, 3GPP TS 23.401, V1.4.1, 2007, 206 pages.

Huawei et al., "Principle of Differentiating Initial Attach and Handover Attach to EPS via LTE or Non-3GPP IP Access," 3GPP TSG SA WG2 Meeting #61, Ljubljana, Slovenia, S2-074831, Nov. 2007, 6 pages.

Huawei, "Attach Type in Attach Procedure," 3GPP TSG SA WG2 Architecture, S2#58, Orlando, FL, S2-072558, Jun. 2007, 5 pages.

Huawei, "Attach Type in Attach Procedure," 3GPP TSG SA WG2 Meeting #59, Helsinki, Finlad, S2-073250, Aug. 2007, 5 pages.

Huawei, "Principle of Differentiating Initial Attach and Handover Attach to EPS via LTE or Non-3GPP IP Access," 3GPP TSG SA WG2 Meeting #60, Kobe Japan, TD S2-073975, Oct. 2007, 4 pages.

Huawei, "Principle of Differentiating Initial Attach and Handover Attach to EPS via LTE," 3GPP TSG SA WG2 Meeting #59, Helsinki, Finland, S2-073812, Aug. 2007, 2 pages.

(56) References Cited

OTHER PUBLICATIONS

Nokia Siemens Networks et al., "Insert Subscriber Data Procedure Clarification," 3GPP TSG SA WG2 Meeting #61, Ljubljana, Slovenia, TD S2-075362, Nov. 2007, 5 pages.
Nokia Siemens Networks et al., "Principle of Differentiating Initial Attach and Handover Attach to EPS via LTE or Non-3GPP IP Access," 3GP TSG SA WG2 Meeting #61, Ljubljana, Slovenia, TD S2-075847, Nov. 2007, 5 pages.
Nokia Siemens Networks et al., "Principle of Differentiating Initial Attach and Handover Attach to EPS via LTE or Non-3GPP IP Access," 3GPP TSG SA WG2 Meeting #61, Ljubljana, Slovenia, TD S2-075460, Nov. 2007, 5 pages.
Nokia Siemens Networks et al., "Principle of Differentiating Initial Attach and Handover Attach to EPS via LTE or Non-3GPP IP Access," 3GPP TSG SA WG2 Meeting #61, Ljubljana, Slovenia, TD S2-075464, Nov. 2007, 5 pages.
"Fast Handovers for Mobile IPv6: draft-ietf-mobileip-fast-mipv6-06.txt" Ed. Rajeev Koodli, Mobile IP Working Group, Internet Draft, Mar. 2003, 43 pages.
3rd Generation Partnership Project; Technical Specification Group Core Network; Digital Cellular Telecommunications System (Phase 2+); General Packet Radio Service (GPRS); Service Description; Stage 2, 3G TS 23.060 version V3.1.0, Oct. 1999, 183 pages.
3rd Generation Partnership Project; Technical Specification Group Services and System Aspects; 3GPP System Architecture Evolution; Architecture Enhancements for Non-3GPP Accesses; Release 8, 3GPP TS 23.402, V0.4.0, Apr. 2007, 31 pages.
Atkinson, Robert C. et al., "The Personal Distributed Environment," IEEE Wireless Communications, IEEE, 2007, pp. 62-69.
Azaire Networks, "EUTRAN—Untrusted Non-3GPP Access Networks Handovers," Agenda Item 8.4.3, 3GPP TSG SA WG2 Architecture—S2#57, Beijing China, S2-072192, Apr. 2007, 4 pages.
Azaire Networks, "PDN GW Selection," Agenda Item 8.1.1, 3GPP TSG SA WG2 Architecture—S2#57, Beijing China, S2-071873, Apr. 2007, 2 pages.
Azaire Networks, "SAE GW Resolution," Agenda Item 8.1.1, 3GPP TSG SA WG2 Architecture—S2#56c Rel-8 Ad-hoc, Warsaw, Poland, S2-071419, Mar. 2007, 2 pages.
Boole, George, *The Mathematical Analysis of Logic: Being an Essay Towards a Calculus of Deductive Reasoning*, Cambridge: Macmillan, Barclay, & Macmillan, 1847, 94 pages.
Chakravorty, Rajiv et al., "Performance Issues with Vertical Handovers—Experiences from GPRS Cellular and WLAN Hot-Spots Integration," Proc. IEEE PerCom, 2004, 11 pages.
Digital Cellular Telecommunications System (Phase 2+); Universal Mobile Telecommunications System (UMTS); General Packet Radio Service (GPRS) Service Description; Stage 2; (3GPP TS 23.060 version 4.8.0 Release 4), ETSI TS 123 060 V4.8.0, Jun. 2003, 202 pages.
Digital Enhanced Cordless Telecommunications (DECT); Common Interface(CI); Part 4: Data Link Control (DLC) Layer, Draft EN 300 175-4, V1.4.1, Feb. 1998, 134 pages.
Ericsson et al., "Mobility Between 3GPP and Un-Trusted Non-3GPP Accesses Using S2c," Agenda Item 8.4.3, 3GPP TSG SA WG2 Architecture—S2#57, Beijing China, S2-072109, Apr. 2007, 8 pages.
Ericsson et al., "SAE Bearer Model and QoS Concept" Agenda Item 8.3.2—SAE Bearer / SAE RB Mapping, 3GPP TSG SA WG2 Architecture—S2#56b Rel-8 Ad-hoc, St. Louis, MO, USA, S2-070713, Feb. 2007, 3 pages.
Ericsson, "Discussion on PDN SAE GW Identity Registration in HSS," Agenda Item 8.1.1, 3GPP TSG SA WG2 Architecture—S2#56c Rel-8 Ad-hoc, Warsaw Poland, S2-071209, Mar. 2007, 4 pages.
Ericsson, "GW Selection for LTE and Non-3GPP Accesses," Agenda Item 8.1.1, 3GPP TSG SA WG2 Architecture—S2#57, Beijing China, S2-071738, Apr. 2007, 20 pages.
Falowo, Olabisi E. et al., "AAA and Mobility Management in UMTS—WLAN Interworking," Proceedings of the 12th International Conference on Telecommunications, ICT2005, Cape Town, 2005, 6 pages.
Hsu, Yu-Chin et al., "A Practical Mechanism for Vertical Handoff in WLAN/3G Integrated Networks," IEEE, 2006, pp. 393-396.
Huawei et al., "PDN Gateway Selection," Agenda Item 8.1.1, 3GPP TSG SA WG2 Architecture—S2#57, Beijing, China, S2-071688, Apr. 2007, 3 pages.
Huawei, Handover from non 3GPP to 3GPP, Agenda Item 8.4.3, 3GPP TSG SA WG2 Architecture—S2#56c Rel-8 Ad-hoc, Warsaw, Poland, S2-071132, Mar. 2007, 4 pages.
Huawei, Handover from non 3GPP to 3GPP, Agenda Item 8.4.3, 3GPP TSG SA WG2 Architecture—S2#57, Beijing, China, S2-071701, Apr. 2007, 3 pages.
Huawei, "Initial LTE Attachment via S8b," Agenda Item 8.4.2, 3GPP TSG SA WG2 Architecture—S2#57, Beijing, China, S2-071697, Apr. 2007, 3 pages.
Huawei, "Storage of PDN GW During Handover from Non 3GPP to 3GPP," Agenda Item 8.4.3, 3GPP TSG SA WG2 Architecture—S2#57, Beijing China, S2-071700, Apr. 2007, 4 pages.
Information Technology—Telecommunications and Information Exchange Between Systems Local and Metropolitan Area Networks—Specific Requirements—Part 11: Wireless LAN Medium Access Control (MAC) and Physical Layer (PHY) Specifications, IEEE Std. 802.11-1997, 1997, 466 pages.
Intel et al., "S2a Initial Attach Procedure," Agenda Item 8.4.2, 3GPP TSG SA WG2 Architecture—S2#56c Rel-8 Ad-hoc, Warsaw Poland, S2-071166, Mar. 2007, 2 pages.
Intel, "Handover from 3GPP Access (UTRAN) to Non-3GPP Access (TS 23.402)," 3GPP TSG SA WG2 Architecture—S2#57, Beijing, China, S2-072202, Apr. 2007, 3 pages.
Jaseemuddin, Muhammad, "An Architecture for Integrating UMTS and 802.11 WLAN Networks," ISCC, 2003, 8 pages.
Kay, Martin, "Standards for Encoding Linguistic Data," the RAND Corporation, 1967, 15 pages.
Kwon, Hyeyeon et al., "Consideration of UMTS-WLAN Seamless Handover," Proceedings of the Seventh IEEE International Symposium on Multimedia, IEEE, 2005, 6 pages.
Lampropoulos, George et al., "Handover Management Architectures in Integrated WLAN / Cellular Networks," IEEE Communications Surveys & Tutorials, vol. 7, No. 4, Fourth Quarter 2005, pp. 30-44.
LG Electronics, "Initial Attach Procedure from Evolved RAN," Agenda Item 8.2.1, 3GPP TSG SA WG2 Architecture—S2#56c Rel-8 Ad-hoc, Warsaw, Poland, S2-071339, Mar. 2007, 8 pages.
Ma, Li et al., "A New Method to Support UMTS/WLAN Vertical Handover Using SCTP," IEEE Wireless Communications, Aug. 2004, pp. 44-51.
Madden, M.G. et al., "Generation of Fault Trees from Simulated Incipient Fault Case Data," Transactions on Information and Communications Technologies, vol. 6, 1994, pp. 567-574.
Motorola, "Handover from Non-3GPP Access to E-UTRAN (TS 23.402)," Agenda Item 8.4.3, 3GPP TSG SA WG2 Architecture—S2#57, Beijing China, S2-072108, Apr. 2007, 6 pages.
Motorola, "Handover from Non-3GPP Access to E-UTRAN (TS 23.402)," Agenda Item 8.4.3, 3GPP TSG SA WG2 Architecture—S2#57, Beijing China, S2-072252, Apr. 2007, 6 pages.
Motorola, "Handover from Non-3GPP Access to E-UTRAN (TS 23.402)," Agenda Item 8.4.3, 3GPP TSG SA WG2 Architecture—S2#57, Beijing China, S2-072296, Apr. 2007, 6 pages.
Nokia Siemens Networks, "PDN GW Selection for LTE and Non-3GPP Access," Agenda Item 8.4.1, 3GPP TSG SA WG2 Architecture—S2#57, Beijing China, Draft S2-072084, Apr. 2007, 2 pages.
Nokia Siemens Networks, et al., "Allocation of PDN-GW Selection Function," Agenda Item 8.1.1, 3GPP TSG SA WG2 Architecture—S2#57, Beijing China, S2-071935, Apr. 2007, 3 pages.
Nokia Siemens Networks, et al., "GPRS Functionality for IMS Emergency Services Support," Chane Request, 3GPP TSG-SA2 Meeting #57, Beijing China, S2-072255, Apr. 2007, 49 pages.

(56) References Cited

OTHER PUBLICATIONS

NTT DoCoMO, "SAE GW Resolution Mechanism Considering 3GPP-non3GPP Mobility," 3GPP TSG SA WG2 Architecture—S2#56c Rel-8 Ad-hoc, Warsaw, Poland, S2-071262, Mar. 2007, 9 pages.

Orgass, Richard, J. et al., "A Base for a Mobile Programming System," Communications of the ACM, vol. 12, No. 9, Sep. 1969, pp. 507-510.

Panasonic, "3GPP to Non-3GPP Handover," Agenda Item 8.4.3, 3GPP TSG SA WG2 Architecture—S2#56c Rel-8 Ad-hoc, Warsaw, Poland, S2-071431, Mar. 2007, 3 pages.

Parikh, Hemish et al., "Seamless Handoff of Mobile Terminal from WLAN to cdma2000 Network," Proc. IEEE ICC, May 2003, 6 pages.

Qualcomm Europe et al., "Principles for Handover Between 3GPP and Non-3GPP Accesses," 3GPP TSG SA WG2 Architecture—S2#57, Beijing China, S2-072188, Apr. 2007, 2 pages.

Report of WG2 Meeting #57, Secretary of 3GPP TSG-SA WG2, 3GPP TSG SA WG2 Architecture—S2#57, Version 1.0.0—Approved at SA WG2 Meeting #58, Beijing China, Apr. 2007, 94 pages.

Samsung et al., "Selection and Retrieval of P-GW Location for Non-3GPP Accesses," Agenda Item 8.4.3, 3GPP TSG SA WG2 Architecture—S2#57, Beijing China, S2-072111, Apr. 2007, 12 pages.

Samsung, "Analysis of HO Procedure Between LTE and Trusted non-3GPP System," Agenda Item 8.4.3, 3GPP TSG SA WG2 Architecture—S2#56c Rel-8 Ad-hoc, Warsaw, Poland, S2-071290, Mar. 2007, 8 pages.

Samsung, "Discussion on UE Radio Access Capabilities in SAE," Agenda Item 8.4.3, 3GPP TSG SA WG2 Architecture—S2#56c Rel-8 Ad-hoc, Warsaw, Poland, S2-071292, Mar. 2007, 2 pages.

Samsung, "Security Context Transfer for Handover Between 3GPP and Trusted Non 3GPP Networks," Agenda Item 8.4.3, 3GPP TSG SA WG2 Architecture—S2#56c, Warsaw, Poland, S2-071437, Mar. 2007, 4 pages.

Schmidt, Anja Louise, "UMTS and WLAN Interoperability," Technical Univeristy of Denmark Research Center COM, Jul. 31, 2004, 123 pages.

Starent et al., "Handover Scenarious Between 3GPP (EUTRA) and Non-3GPP Access Systems Using S2a Reference Point with PMIP6," Agenda Item 8.4.3, 3GPP TSG SA WG2 Architecture–S2#57, Beijing, China, S2-072099, Apr. 2007, 9 pages.

Starent et al., "Handover Scenarious Between 3GPP (EUTRA) and Untrused Non-3GPP Access Systems Using S2c Reference Point," Agenda Item 8.4.3, 3GPP TSG SA WG2 Architecture—52#57, Beijing, China, S2-072200, Apr. 2007, 6 pages.

Stein, Jared, "Survey of IEEE802.21 Media Independent Handover Services," Apr. 2006, printed from the internet at <http://www.cse.wustl.edu/~jain/cse574-06/ftp/handover/>, on Jun. 2016, 16 pages.

Telecom Italia, "AAA Impacts on Inter-System Handover Latency," Agenda Item 8.4.3, 3GPP TSG SA WG2 Architecture—S2#56c Rel-8 Ad-hoc, Warsaw, Poland, S2-071338, Mar. 2007, 3 pages.

Tsao, Shiao-Li et al., "Design and Evaluation of UMTS-WLAN Interworking Strategies," IEEE, 2002, pp. 777-781.

Varma, Vijay K. et al., "Mobility Management in Integrated UMTS/WLAN Networks," IEEE, 2003, pp. 1048-1053.

VTT Electronics, "Efficient Wireless Networking with Advanced Services and Negotiated QoS," Eds. Tapio Frantti et al., VTT Research Notes 2248, 2004, 113 pages.

Wang, Ying-Hong, et al., "A Mobile IPv6 Based Seamless Handoff Strategy for Heterogeneous Wireless Networks," Proceedings of the Fourth International Conference on Computer and Information Technology, IEEE, 2004, 6 pages.

Ylianttila, M. et al., "Optimization Scheme for Mobile Users Performing Vertical Handoffs between IEEE 802.11 and GPRS/EDGE Networks," IEEE, 2001, 5 pages.

"$3^{rd}$ Generation Partnership Project; Technical Specification Group Services and System Aspects; Feasibility Study of Mobility between 3GPP-WLAN Interworking and 3GPP Systems (Release 8)," Global System for Mobile Communications, 3GPP TR 23.937, V0.0.2, Mar. 2007, 17 pages.

Azaire Networks, "PDN GW Selection," 3GPP TSG SA WG2 Architecture, S2#57, Beijing, China, S2-071873, 2 pages.

Ericsson, "GW Selection for LTE and Non-3GPP accesses," 3GPP TSG SA WG2 Architecture, S2#57, Beijing, China, S2-071738, Apr. 2007, 18 pages.

Nokia Siemens Networks, "PDN GW Selection for LTE and Non-3GPP Access," 3GPP TSG SA WG2 Architecture, S2#57, Beijing, China, S2-072182, Apr. 2007, 2 pages.

Starent et al., "Handover Scenarios Between 3GPP and Untrusted Non-3GPP Access Systems Using S2c Reference Point," 3GPP TSG SA WG2 Architecture, S2#57, Beijing, China, S2-072294, Apr. 2007, 5 pages.

Siemens, "QoS signalling for non-3GPP IP access systems," XP050229734, S2-064245, 3GPP TSG SA WG2 Architecture—SAE Adhoc, Nov. 14-17, 2006, 4 pages.

Exhibit B-1, "U.S. Pat. No. 7,586,878 to Hsu et al. ("Hsu et al.")," Aug. 11, 2016, 33 pages.

Exhibit B-2, "Admitted Prior Art in U.S. Pat. No. 8,638,750 ("The '750 Admitted Prior Art")," Aug. 11, 2016, 42 pages.

Exhibit B-3, S2-072252, "Handover from non-3GPP Access to E-Utran (TS 23A02), Motorola, 3GPP TSG SA WG2 52#47, Apr. 23-27, 2007, ("S2-072252")," Aug. 11, 2016, 27 pages.

Exhibit B-4, "Prior Art Standard 3GPP TS 23.401v1.0.0 and 3GPP TS 23.402v1.0.0 (collectively, the "Prior Art Standard")," Aug. 11, 2016, 39 pages.

Exhibit B-5, "Yu-Ching Hsu and Pai-Feng Tsai, a Practical Mechanism for Vertical Handoff in WLAN/3G Integrated Networks ("Hsu and Tsai")," Aug. 11, 2016, 34 pages.

Exhibit A, Case 2:16-cv-00056-JRG-RSP, Document 110-1, Filed Aug. 11, 2016, 41 pages.

Declaration of Sundeep Rangan, Ph.D., Before the Patent Trial and Appeal Board, T-Mobile Js, Inc. And T-Mobile Usa, Inc., Petitioners v. Patent Owner of U.S. Pat. No. 8,638,750 to Wu et al., Trial No. PR2017-00671, Jan. 17, 2017, 103 pages.

Declaration of Craig Bishop, Before the Patent Trial and Appeal Board, T-Mobile US, Inc. And T-Mobile Usa, Inc. Petitioners v. Patent Owner of U.S. Pat. No. 8,638,750 to Wu et aL,Trial No. IPR2017-00671, Jan. 13, 2017, 25 pages.

'3rd Generation Partnership Project; Technical Specification Group Services and System Aspects; Architecture Enhancements for non-3GPP accesses (Release 8), 3GPP Ts 23.402, V1.0.0, May 2007, 50 pages.

Decision, Institution of Inter Partes Review 35 U.S.C. § 314(a) and 37 C.F.R. § 42.108, *T-Mobile US, Inc. And Tmobile Usa, Inc.* , Petitioner, v. *Huawei Technologies Co. Ltd.* , Patent Owner., Case IPR2017-00671, Patent 3,638,750 B2, Jul. 31, 2017, 24 pages.

Petition for Inter Partes Review of U.S. Pat. No. 8,638,750 Under 35 U.S.C. § 312 and 37 C.F.R. 42.104, Before the Patent Trial and Appeal Board, T-Mobile US, Inc. And T-Mobile Usa, Inc., *Petitioners*v. *Patent Owner of U.S. Pat. No. 8,638,750*to Wu et al., Trial No. IPR2017-00671, Jan. 19, 2017, 81 pages.

Defendants T-Mobile US, Inc. And T-Mobile Usa, Inc.'S and Intervenors Nokia Solutions and Networks US LLC and Nokia Solutions and Networks Oy'S P.R. 3-3 Invalidity Contentions, Civil Action No. 2:16-cv-00056-JRG-RSP, Aug. 11, 2016, 314 pages.

* cited by examiner

METHOD AND NETWORK DEVICE FOR CREATING AND DELETING RESOURCES

CROSS REFERENCE TO RELATED APPLICATIONS

This application is a continuation of U.S. application Ser. No. 12/509,677, filed on Jul. 27, 2009, which is a continuation of International Patent Application No. PCT/CN2008/071400 filed on Jun. 20, 2008, which claims priority to Chinese Patent Application Nos. 200710126555.0, filed on Jun. 22, 2007, and 200710159785.7, filed on Dec. 21, 2007, The afore-mentioned patent applications are hereby incorporated by reference in their entireties.

FIELD OF THE INVENTION

The present invention relates to communication, and more particularly, to a method and a network device for creating resources.

BACKGROUND

In order to enhance the competitive power of future networks, the Third Generation Partnership Project (3GPP) is motivated to work on a new evolved network. The architecture of such an evolved network as illustrated in FIG. 1 includes: an evolved Universal Mobile Telecommunications System (UMTS) Terrestrial Radio Access Network (TRAN), abbreviated as E-UTRAN, which performs functionalities related to radio access in evolved networks; a Mobility Management Entity (MME) which is responsible for mobility management of control plane, including user context and mobility status management, user temporary identity allocation, and so on; a Serving Gateway (Serving GW) which is a user plane anchor between 3GPP access systems, terminating the interface to the E-UTRAN; a Packet Data Network Gateway (PDN GW), also referred to as Anchor Gateway, which is a user plane anchor between 3GPP and Non-3GPP access systems, terminating the interface to an external Packet Data Network (PDN); a Policy and Charging Rule Function (PCRF) which provides policy control decision and flow charging control functionalities; and a Home Subscriber Server (HSS) which stores user subscription information.

UMTS Terrestrial Radio Access Network (UTRAN) and Global System for Mobile communications (GSM)/Enhanced Data Rate for GSM Evolution (EDGE) Radio Access Network (GERAN) perform functionalities related to radio access in existing General Packet Radio Service (GPRS)/UMTS networks. Serving GPRS Supporting Node (SGSN) performs functionalities such as routing and forwarding, mobility management, session management, user information storage, etc. in the GPRS/UMTS network.

Non-3GPP IP Access Networks mainly refer to access networks defined by some Non-3GPP organizations, such as Wireless Local Area Network (WLAN), Worldwide Interoperability for Microwave Access (Wimax), and the like.

Authentication, Authorization and Accounting Server (AAA Server) performs Authentication, Authorization and Accounting functionalities for User Equipments (UEs).

One requirement on the evolved network is to support handover between a 3GPP access system (such as GERAN/UTRAN/E-UTRAN) and a Non-3GPP access system (such as WLAN/Wimax and so on). The handover process may be implemented through an Attach procedure of a UE to a new access system. FIG. 2 is a flowchart illustrating a handover process from a Non-3GPP access system to a 3GPP access system. The handover process includes the following steps.

1. A UE may attach to a Non-3GPP access network though a Non-3GPP GW and a PDN GW.
2. The UE may initiate a handover from the Non-3GPP access system to a System Architecture Evolution (SAE) system.
3. The UE may send an Attach Request message to an MME.
4. An authentication process may be performed among the UE, the MME, and an HSS/AAA Server.
5. A Location Update and Subscriber Data Retrieval process may be performed between the MME and the HSS/AAA Server. In this process, the MME may obtain address information of the PDN GW used by the UE in the Non-3GPP access system.
6. The MME may send a Create Default Bearer Request message to a Serving GW.
7a. If the Serving GW and the PDN GW are interfaced using the GPRS Tunneling Protocol (GTP), the Serving GW may send a Create Default Bearer Request message to the PDN GW.
7b. If the Serving GW and the PDN GW are interfaced using the Proxy Mobile Internet Protocol (PMIP), the Serving GW may send a Proxy Binding Update message to the PDN GW.
8a. If the Serving GW and the PDN GW are interfaced using the GTP, the PDN GW may send back a Create Default Bearer Response message to the Serving GW.
8b. If the Serving GW and the PDN GW are interfaced using the PMIP, the PDN GW may send back a Proxy Binding Acknowledgement (ACK) message to the Serving GW.
9. The Serving GW may send back a Create Default Bearer Response message to the MME.
10. The MME may initiate a Radio Bearer Setup process to set up the radio bearer corresponding to the default bearer, and may initiate an Attach Complete process.

The following two points should be noted. (1) The handover process from the Non-3GPP system to the SAE or other 3GPP system (such as GPRS/UMTS system) may be completed through the Attach process (but not limited to the Attach process), and actually may be completed though other processes. (2) If the Serving GW and the PDN GW are implemented at a same entity, the messages between the Serving GW and the PDN GW become internal messages at the entity.

During practice, the inventor of the present invention encounters the following drawbacks in above mentioned existing handover process in the prior art.

1. During handover from the Non-3GPP system to the 3GPP system, in order to guarantee service continuity for the UE, the 3GPP system need recover the resources used by the UE in the Non-3GPP system access system, however, there is no such a mechanism in the existing handover process from the Non-3GPP system to the 3GPP system.
2. In a normal 3GPP access process, the 3GPP system only creates a default bearer for the UE. However, in an access process during handover from the Non-3GPP system to the 3GPP system, the 3GPP system need recover the resources used by the UE in the Non-3GPP system access system. Above two access processes are different, and the 3GPP system need differentiate the two different access processes, but there is no such a mechanism for differentiating the different access processes in the existing 3GPP system.

3. In an access process in the existing 3GPP system, the UE initiates the establishment of one default bearer only, in other words, the MME can only initiates a Create Default Bearer process to one PDN GW. If the UE uses multiple PDN GWs in the Non-3GPP access system, the existing mechanism cannot work.

4. In the prior art, the handover between the Non-3GPP system and the 3GPP system is a "loosely coupled" handover, in other words, the UE firstly disconnects form the source system, and then completes the handover through the access process in the destination system. In such a way of handover, the service may be interrupted for a long time and may possibly be turned down. There is no mechanism in prior art about how to optimize the handover between the Non-3GPP system and the 3GPP system so as to decrease the service interruption time for the UE.

5. When the UE accesses a Non-3GPP access system, the Non-3GPP access system may allocate resources to the UE. When abnormal switch off or offline occurs on the UE, the resources allocated to the UE by the Non-3GPP access system will not be released. When the UE newly accesses to a 3GPP access system, the resources which was allocated to the UE by the Non-3GPP access system need be released, however there is no such a mechanism for handling this in the prior art.

SUMMARY

The present invention aims at providing a method for creating resources, a method for deleting resources, and a network device, in which an initial access process and a handover process for a User Equipment (UE) may be differentiated so as to perform corresponding processes on resources.

An embodiment of the present invention provides a method for creating resources, the method includes: notifying, by a first network element, a second network element at network side of a process type for creating resources for a user equipment (UE), when the UE performs handover between a 3GPP network and a Non-3GPP network or initiates an initial access request; and performing, by the second network element, a process for creating resources for the UE according to the process type.

Another embodiment of the present invention provides a method for restoring resources during handover between heterogeneous networks, the method includes: obtaining, by a gateway at network side, Policy and Charging Control (PCC) rules to be used by a UE in a destination access network, when the UE performs handover between a 3GPP network and a Non-3GPP network or initiates an initial access request; initiating, by the gateway at network side, a process for creating bearer at network side in the destination access system according to the PCC rules. The gateway at network side may be a Serving Gateway, an Anchor Gateway, or a Non-3GPP Gateway.

An embodiment of the present invention provides a method for deleting resources, the method includes: obtaining, by a first network element, address information of a second network element, when a UE performs handover between a 3GPP network and a Non-3GPP network or initiates an initial access request; sending a message from the first network element to notify the second network element to release resources allocated to the UE; releasing, by the second network element, the resources allocated to the UE. The method may also include determining that an access request initiated by the UE is an initial access request.

An embodiment of the present invention provides another method for deleting resources, the method includes: notifying, by a network element of a destination access network, a user plane anchor not to initiate a process for releasing resources in a source access network, when a UE performs handover between a 3GPP network and a Non-3GPP network or initiates an initial access request; sending, from the network element of the destination access network to a network element of the source access network, a message for notifying the source network that the UE has switched to the destination access network, after the UE has switched to the destination access network; initiating, by the network element of the source access network after receiving the message, the process for releasing resources in the source access network.

Accordingly, an embodiment of the present invention provides a network device for processing network resources, the network devices includes an access request determining unit and a process type notifying unit. The access request determining unit is adapted to determine whether an access request initiated by a UE is an initial access request or a handover request between a 3GPP access system and a Non-3GPP access system, and send the determined result to the process type notifying unit. The process type notifying unit is adapted to receive the determined result from the access request determining unit, determine a process type for creating resources for the UE, and notify the process type to a network element at network side which is adapted to create the resources for the UE An embodiment of the present invention provides another network device for processing network resources, the network devices includes an identifying unit and a resource creating unit. The identifying unit is adapted to, when a UE performs handover between a 3GPP network and a Non-3GPP network or initiates an initial access request, receive a message from another network element, identify a process type for creating resources for the UE from the message, and notify the resource creating unit of the identified process type. The resource creating unit is adapted to receive the process type from the identifying unit, and perform a process for creating resources for the UE according to the process type.

An embodiment of the present invention provides a network device for releasing network resources, where the network device includes an initial request determining unit, a network element address obtaining unit, and a resource release notifying unit. The initial request determining unit is adapted to determine that an access request initiated by a UE is an initial access request when the UE performs handover between a 3GPP network and a Non-3GPP network, and notify the determined result to the network element address obtaining unit. The network element address obtaining unit is adapted to obtain address information of an anchor gateway used by the UE, and send the address information to the resource release notifying unit. The resource release notifying unit is adapted to send a Resource Release Notification message to the anchor gateway according to the address information sent from the network element address obtaining unit, to request to release resources allocated to the UE.

An embodiment of the present invention provides a network device for releasing network resources, where the network device includes a Resource Release message identifying unit and a resource releasing unit. The Resource Release message identifying unit is adapted to identify a received Resource Release Notification message when a UE performs handover between a 3GPP network and a Non- 3GPP network or initiates an initial access request, and send the message to the resource releasing unit. The resource releasing unit is adapted to release resources allocated to the UE.

According to the resource creating mechanism provided in embodiments of the present invention, the first network element may notify the second network element at network side of the process type for creating resources for the UE, and the second network element may perform a process for creating resources for the UE according to the process type. In such a way, the problem in the prior art that the gateway at network side (i.e., the second network element) cannot differentiate different access requests (i.e., the initial access request and the access request caused by handover between access systems) and thus cannot create corresponding resources with respect to the different access requests may be overcome.

According to the resource deleting mechanism provided in embodiments of the present invention, the first network element may obtain address information of the second network element from a network element on which the address information of the second network element is stored; the first network element may send a message to notify the second network element to release the resources allocated to the UE; and the second network element may release the resources allocated to the UE. In such a way, when abnormal switch off or offline occurs on the UE, the PCC rules used by the UE and the resources allocated to the UE which are stored on the anchor gateway may be deleted.

DETAILED DESCRIPTION

First Embodiment

Figure 1:
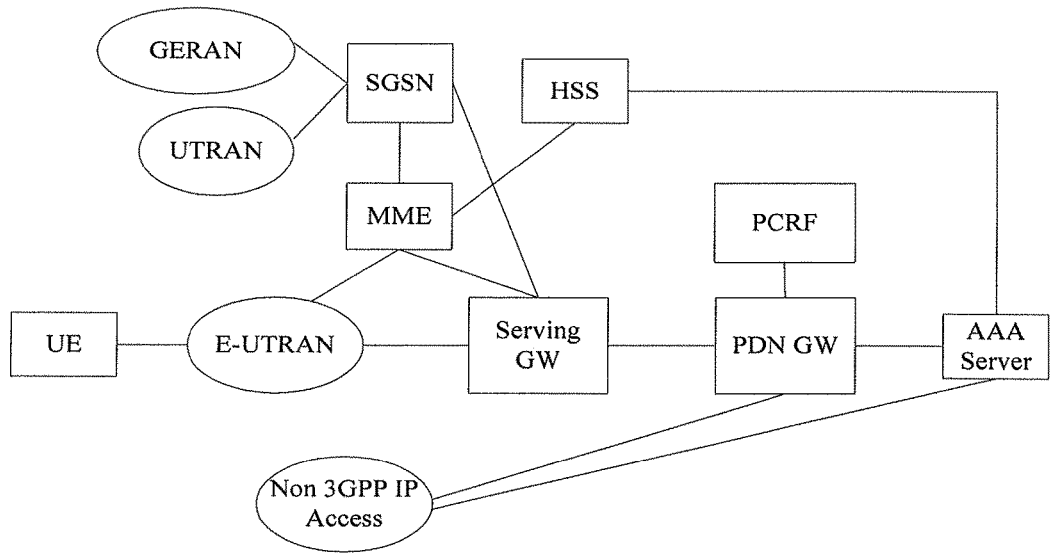
FIG. 1 is a schematic diagram illustrating the architecture of an evolved network system in the prior art.
Figure 2:
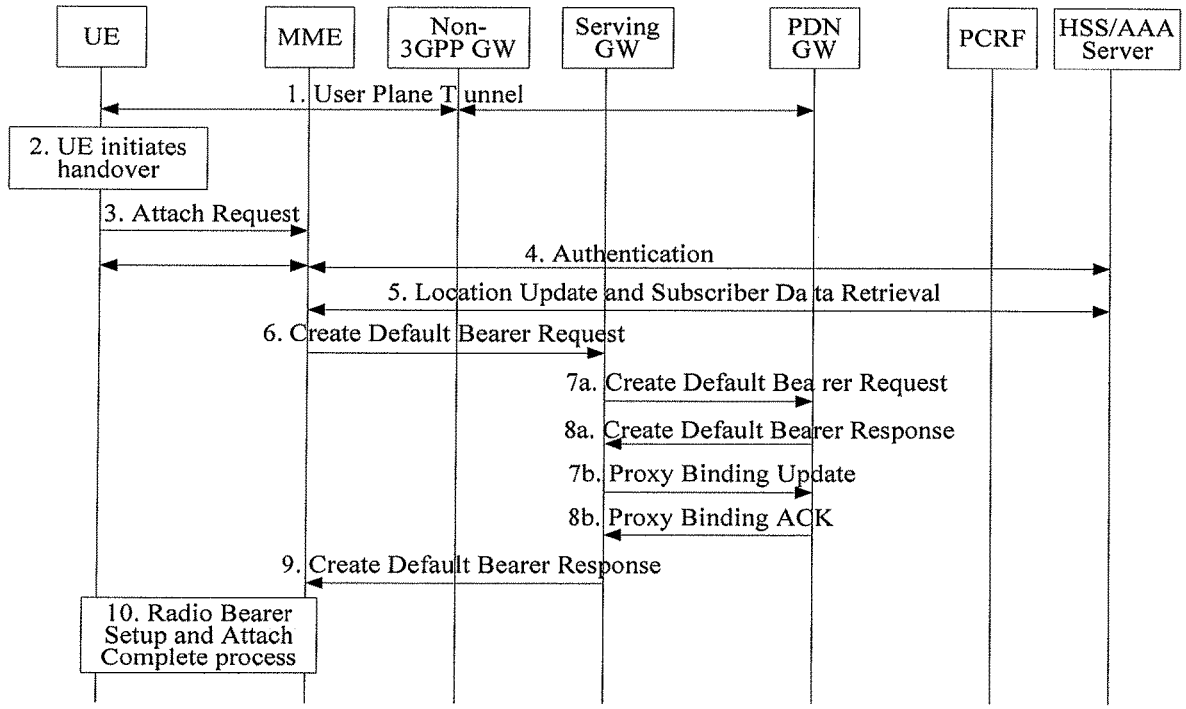
FIG. 2 is a flowchart illustrating a process for handover from a Non-3GPP system to a 3GPP system in the prior art.
Figure 3:
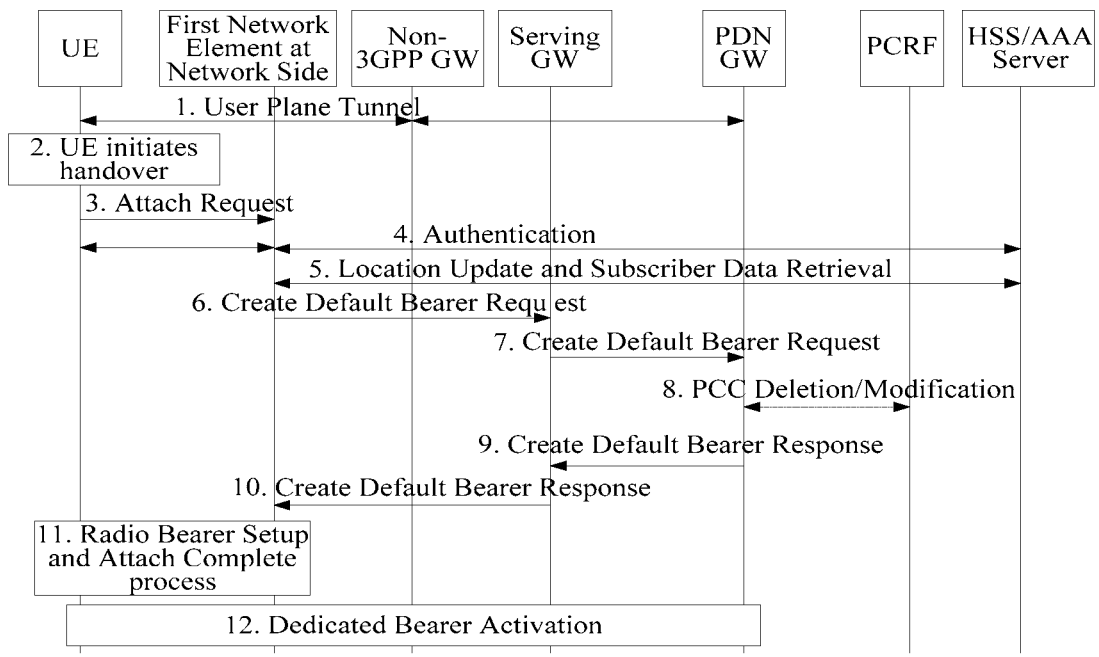
FIG. 3 is a flowchart illustrating a signaling interaction process for creating resources according to a first embodiment of the present invention.

When a first network element at network side sends a Create Default Bearer Request (or a Create Default Packet Data Protocol (PDP) Context Request) message to a Serving GW, a flag may be included in the message to indicate the process type for creating bearer (or for creating PDP Context). The Serving GW may send to a PDN GW a Create Default Bearer Request (or a Create Default PDP Context Request) message, which includes a flag to indicate the process type. After receiving the message, the PDN GW may perform different processes according to the flag. FIG. 3 illustrates a specific process including the following steps.

1. A UE may get access to a Non-3GPP access network though a Non-3GPP GW and a PDN GW.

2. The UE may initiate a handover from the Non-3GPP access system to a 3GPP access system.

3. The UE may send to a first network element at network side an Attach Request message for performing a handover process from the Non-3GPP access system to the 3GPP access system. The first network element at network side may be an MME in a System Architecture Evolution (SAE) system, and may be a GPRS Supporting Node (SGSN) in a GPRS/UMTS system. The first network element at network side may determine whether the received access request is a handover request from the Non-3GPP access system to the 3GPP access system or a normal access request (also referred to as an initial access request) through the following measures.

(1) If the handover process from the Non-3GPP access system to the 3GPP access system is also performed through the Attach process, an Attach Type field may be included in the Attach Request message to indicate different access types. For example, the Attach Type field may be set to be Initial Attach for a normal access, and may be set to be Handover Attach for a handover access. The first network element at network side may distinguish different access processes according to the Attach Type field in the Attach Request message.

(2) If the UE stores the address information of the PDN GW used by the UE when accessing a 3GPP or Non-3GPP system, the Attach Request message in the normal access process may not include the address information of the PDN GW, and the Attach Request message in the handover process from the Non-3GPP access system to the 3GPP access system may include the address information of the PDN GW. After receiving the Attach Request message, the first network element at network side may determine whether the access request is a normal access request or an access request due to handover according to whether the Attach Request message includes the address information of the PDN GW.

(3) If the handover process from the Non-3GPP access system to the 3GPP access system is performed through a separate process rather than the Attach process, for example, the UE may send to the first network element at network side a Non-3GPP to 3GPP Handover Request message, requesting the MME to perform the handover process from the Non-3GPP access system to the 3GPP access system.

4. An authentication process may be performed among the UE, the first network element at network side, and an HSS/AAA Server.

5. A Location Update and Subscriber Data Retrieval process may be performed between the first network element at network side and the HSS/AAA Server. In this process, the first network element at network side may obtain the address information of the PDN GW used by the UE in the Non-3GPP access system.

6. For a normal access process, the first network element at network side may select a PDN GW for the UE according to a default Access Point Name (APN) in the subscriber data. For a handover access process, the first network element at network side may use the PDN GW that was used by the UE in the Non-3GPP access system (the first network element at network side may obtain the address information of the PDN GW from the HSS/AAA Server, or the HSS/AAA Server may send the stored address information of the PDN GW to the first network element at network side). If the 3GPP system is an SAE system, the first network element at network side may send a Create Default Bearer Request message to a Serving GW. If the 3GPP system is a GPRS/UMTS system, the first network element at network side may send a Create Default PDP Context Request message to the Serving GW. A flag may be included in the message to indicate the process type for creating the bearer. Specific measures for implementing the flag are provided below.

(1) The flag may be a "Create Type" flag. The Create Type flag may be set as "Initial Create" for a normal access process, and may be set as "Handover Create" for a handover access process.

(2) The flag may be a "Cause" value. The Cause value may be set as "Initial" for a normal access process, and may be set as "Handover" for a handover access process.

(3) The flag may be a "Handover Indication" flag. For a handover access process, the Request message sent by the first network element at network side may include the Handover Indication flag to indicate that the Request message is caused by a handover access. For a normal access process, the Request message sent by the first network element at network side does not include this flag.

(4) The flag may be an "Initial Indication" flag. For a normal access process, the Request message sent by the first network element at network side may include the Initial Indication flag to indicate that the Request message is caused by a normal access. For a handover access process, the Request message sent by the first network element at network side does not include this flag.

7. If the Serving GW and the PDN GW are interfaced using the GTP protocol and the 3GPP system is an SAE system, the Serving GW may send a Create Default Bearer Request message to the PDN GW; if the 3GPP system is a GPRS/UMTS system, the Serving GW may send a Create Default PDP Context Request message to the PDN GW. A flag may be included in the message to indicate the process type for creating the bearer. Specific measures for implementing the flag are provided below.

(1) The flag may be a "Create Type" flag. The Create Type flag may be set as "Initial Create" for a normal access process, and may be set as "Handover Create" for a handover access process.

(2) The flag may be a "Cause" value. The Cause value may be set as "Initial" for a normal access process, and may be set as "Handover" for a handover access process.

(3) The flag may be a "Handover Indication" flag. For a handover access process, the Request message sent by the Serving GW may include the Handover Indication flag to indicate that the Request message is caused by a handover access. For a normal access process, the Request message sent by the Serving GW does not include this flag.

(4) The flag may be an "Initial Indication" flag. For a normal access process, the Request message sent by the Serving GW may include the Initial Indication flag to indicate that the Request message is caused by a normal access. For a handover access process, the Request message sent by the Serving GW does not include this flag.

8. After receiving the Request message, the PDN GW may determine the process type for creating bear according to the flag in the message, and may perform different processes according to the process type for creating bear as follows.

(1) If the process type for creating bear indicates to create bearer for a normal access, the PDN GW may inquire whether Policy and Charging Control (PCC) rules for the UE exist in the PDN GW. If the rules exist in the PDN GW, the PDN GW may delete the PCC rules for the UE while notifying a PCRF to delete the stored PCC rules. Meanwhile, the PDN GW may initiate a process for releasing resources in the source Non-3GPP access network, to release the resources in the source Non-3GPP access network.

(2) If the process type for creating bear indicates to create bearer for a handover access, the PDN GW may obtain the PCC rules for the UE stored in the PDN GW. The PDN GW may determine whether the PCC rules are dependent on the access type of an IP-Connectivity Access Network (IP-CAN), if the PCC rules are dependent on the access type, the PDN GW may contact the PCRF to obtain modified PCC rules. Meanwhile, the PDN GW may initiate a process for releasing resources in the source Non-3GPP access network, to release the resources in the source Non-3GPP access network.

9. The PDN GW may send back a Create Default Bearer Response message to the Serving GW.

10. The Serving GW may send back a Create Default Bearer Response message to the first network element at network side.

11. The first network element at network side may initiate a Create Radio Bearer process to create the radio bearer corresponding to the default bearer, and may initiate an Attach Complete process.

12. If the access process type is an access process caused by handover, the PDN GW may initiate a Dedicated Bearer Activation process at the network side according to the stored or modified PCC rules, to create the dedicated bearer corresponding to the PCC rules, in other words, to create resources in the 3GPP system to be required for the services which are used by the UE in the source Non-3GPP access system.

The following should be noted.

(1) If the Serving GW and the PDN GW are implemented at a same entity, the messages between the Serving GW and the PDN GW become internal messages at the entity.

(2) Steps 12 and 9 are not necessarily performed in a fixed order; instead, they may be performed in any order.

(3) In the case that no process type for creating bearer is included in the message, if the PDN GW finds that PCC rules for the UE are stored in the PDN GW after the PDN GW receives the message from the Serving GW, the PDN GW may initiate a Dedicated Bearer Activation process at the network side according to the stored PCC rules or the modified PCC rules (the PDN GW may contact the PCRF to obtain the modified PCC rules), to create the dedicated bearer corresponding to the PCC rules, in other words, to create resources in the 3GPP system to be required for the services which are used by the UE in the source Non-3GPP access system. Meanwhile, the PDN GW may initiate a process for releasing resources in the source Non-3GPP access network, to release the resources in the source Non-3GPP access network.

Embodiment 2

Figure 4:
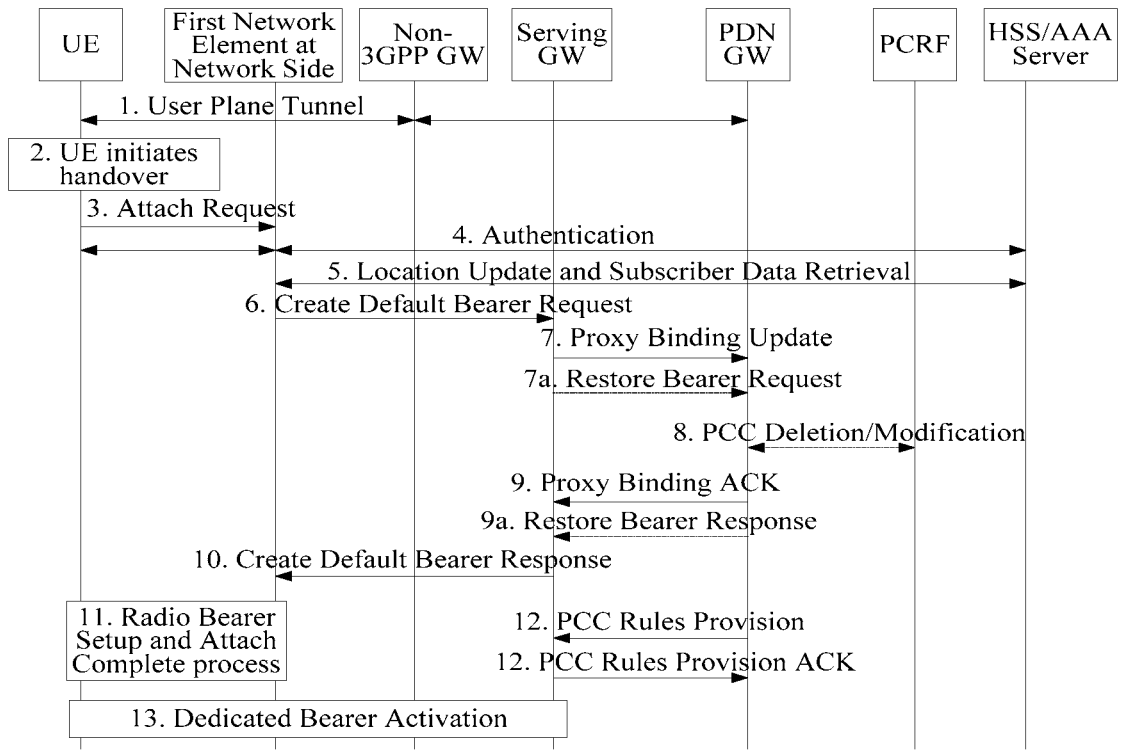
FIG. 4 is a flowchart illustrating a signaling interaction process for creating resources according to a second embodiment of the present invention.

A first network element at network side may send to a Serving GW a Create Default Bearer Request (or a Create Default PDP Context Request), which includes a flag to indicate the process type for creating bearer (or Creating PDP context). The Serving GW may send to a PDN GW a Proxy Binding Update message, which includes a flag to indicate the process type. After receiving the message, the PDN GW performs different processes according to the flag. FIG. 4 illustrates a specific process including the following steps.

1. A UE may get access to a Non-3GPP access network though a Non-3GPP GW and a PDN GW.

2. The UE may initiate a handover from the Non-3GPP access system to a 3GPP access system.

3. The UE may send to a first network element at network side an Attach Request message for performing a handover process from the Non-3GPP access system to the 3GPP access system. The first network element at network side may be an MME in an SAE system, and may be an SGSN in a GPRS/UMTS system.

4. An authentication process may be performed among the UE, the first network element at network side, and an HSS/AAA Server.

5. A Location Update and Subscriber Data Retrieval process may be performed between the first network element at network side and the HSS/AAA Server. In this process, the first network element at network side may obtain the address information of the PDN GW used by the UE in the Non-3GPP access system.

6. For a normal access process, the first network element at network side may select a PDN GW for the UE according to a default APN in the Subscriber Data. For a handover access process, the first network element at network side may use the PDN GW that was used by the UE in the Non-3GPP access system (the first network element at network side may obtain the address information of the PDN GW from the HSS/AAA Server, or the HSS/AAA Server may send the stored address information of the PDN GW to the first network element at network side). If the 3GPP system is an SAE system, the first network element at network side may send a Create Default Bearer Request message to a Serving GW. If the 3GPP system is a GPRS/UMTS system, the first network element at network side may send a Create Default PDP Context Request message to the Serving GW. A flag may be included in the message to indicate the process type for creating bearer. Specific measures for implementing the flag are similar to those in the first embodiment.

7. If the Serving GW and the PDN GW are interfaced using the PMIP protocol, the Serving GW may send a Proxy Binding Update message to the PDN GW. A flag may be included in the message to indicate the process type for updating binding. Specific measures for implementing the flag are provided below.

(1) The flag may be a "Binding Type" flag. The Binding Type flag may be set as "Initial Binding" for a normal access process, and may be set as "Handover Binding" for a handover access process.

(2) The flag may be a "Cause" value. The Cause value may be set as "Initial" for a normal access process, and may be set as "Handover" for a handover access process.

(3) The flag may be a "Handover Indication" flag. For a handover access process, the message sent by the Serving GW may include the Handover Indication flag to indicate that the message is caused by a handover access. For a normal access process, the message sent by the Serving GW does not include this flag.

(4) The flag may be an "Initial Indication" flag. For a normal access process, the message sent by the Serving GW may include the Initial Indication flag to indicate that the message is caused by a normal access. For a handover access process, the message sent by the Serving GW does not include this flag.

7a. This step may be performed as follows.

No modification is made in the Proxy Binding Update message. In the case of handover access, the Serving GW may send a Restore Bearer Request (if the 3GPP system is a GPRS/UMTS system) or a Restore PDP Context Request (if the 3GPP system is a SAE system) message to the PDN GW, to notify the PDN GW to restore the bearer used by the UE.

8. After receiving the Proxy Binding Update message, the PDN GW may determine the process type for updating binding according to the flag in the Proxy Binding Update message, or the PDN GW may determine whether the Restore Bearer Request message is received, and then the PDN GW may perform different processes according to the process type for updating binding or according to whether the Restore Bearer Request message is received as follows.

(1) If the process type for updating binding in the Proxy Binding Update message indicates to update binding for a normal access, the PDN GW may inquire whether PCC rules for the UE exist in the PDN GW. If the rules exist in the PDN GW, the PDN GW may delete the PCC rules for the UE while notifying a PCRF to delete the stored PCC rules. Meanwhile, the PDN GW may initiate a process for releasing resources in the source Non-3GPP access network, to release the resources in the source Non-3GPP access network.

(2) If the process type for updating binding in the Proxy Binding Update message indicates to update binding for a handover access or if the PDN GW receives a Restore Bearer Request (or a Restore PDP Context Request) message, the PDN GW may obtain the PCC rules for the UE stored in the PDN GW. The PDN GW may determine whether the PCC rules are dependent on the access type of an IP-CAN, if the PCC rules are dependent on the access type of the IP-CAN, the PDN GW may contact the PCRF to obtain modified PCC rules. Meanwhile, the PDN GW may initiate a process for releasing resources in the source Non-3GPP access network, to release the resources in the source Non-3GPP access network.

9. The PDN GW may send back a Proxy Binding ACK message to the Serving GW.

9a. If the PDN GW receives the Restore Bearer Request (or the Restore PDP Context Request) message from the Serving GW in previous step, the PDN GW may send back a Restore Bearer Response (or a Restore PDP Context Response) message to the Serving GW 10. The Serving GW may send back a Create Default Bearer Response message to the first network element at network side.

11. The first network element at network side may initiate a Create Radio Bearer process to create the radio bearer corresponding to the default bearer, and may initiate an Attach Complete process.

12. If the access process type is an access process caused by handover, PDN GW may send to the Serving GW a PCC Rules Provision message, which provides the stored or modified PCC rules to the Serving GW. The Serving GW may store the received PCC rules and may send back a PCC Rules Provision ACK message to the PDN GW.

13. The Serving GW may initiate a Dedicated Bearer Activation process at the network side according to the received PCC rules, to create the dedicated bearer corresponding to the PCC rules, in other words, to create resources in the 3GPP network to be required for the services which are used by the UE in the source Non-3GPP access system.

The following should be noted.

(1) If the Serving GW and the PDN GW are implemented at a same entity, the messages between the Serving GW and the PDN GW become internal messages at the entity.

(2) Steps 12 and 9 are not necessarily performed in a fixed order; instead, they may be performed in any order.

(3) It is not limited in the embodiment about how the PDN GW sends the PCC rules to the Serving GW.

(4) In the case that no process type information for creating bearer or updating binding is included in the message, if the PDN GW finds that PCC rules for the UE are stored in the PDN GW after the PDN GW receives the message from the Serving GW, the PDN GW may send the stored PCC rules or the modified PCC rules (the PDN GW may contact the PCRF to obtain the modified PCC rules) to the Serving GW, and the Serving GW may initiate a Dedicated Bearer Activation process at the network side according to the received PCC rules, to create the dedicated bearer corresponding to the PCC rules, in other words, to create resources in the 3GPP system to be required for the services which are used by the UE in the source Non-3GPP access system.

Embodiment 3

Figure 5:
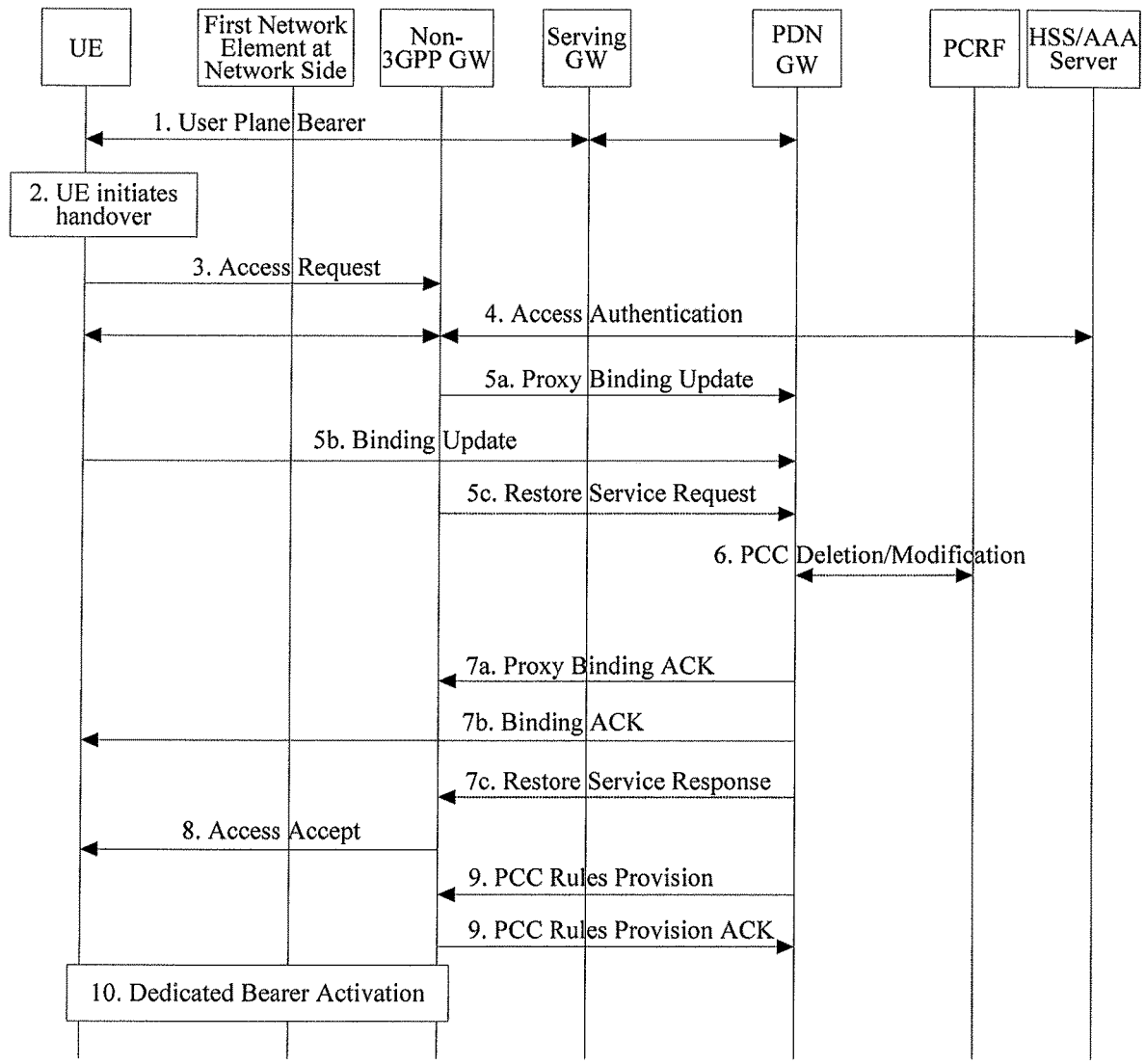
FIG. 5 is a flowchart illustrating a signaling interaction process for creating resources according to a third embodiment of the present invention.

A Non-3GPP GW may send to a PDN GW a Proxy Binding Update message, which includes a flag to indicate the process type. The PDN GW may perform different processes according to the flag after receiving the message. FIG. 5 illustrates a specific process including the following steps.

1. A UE may access to a 3GPP access network though a Serving GW and a PDN GW.

2. The UE may initiate a handover from the 3GPP access system to a Non-3GPP access system.

3. The UE may send to a Non-3GPP GW an Access Request message for performing a handover process from the 3GPP system to the Non-3GPP system. The Non-3GPP GW may be an Evolved Packet Data Gateway (EPDG) in a WLAN system, may be an Access Service Network Gateway (ASN GW) in a Wimax system, and may be an Access Gateway (AGW) in a CDMA system. The Non-3GPP GW may determine whether the received Access Request is a handover request from the 3GPP access system to the Non-3GPP access system or a normal access request (also referred to as initial access request) through the following measures.

(1) If the handover process from the 3GPP access system to the Non-3GPP access system is also performed through the Access process, an Access Type field may be included in the Access Request message to indicate different process types. For example, the Access Type field may be set as Initial Access for a normal access, and may be set as Handover Access for a handover access. The Non-3GPP GW may distinguish different access processes according to the Access Type field in the Access Request message.

(2) If the UE stores address information of the PDN GW that the UE used when accessing a 3GPP or Non-3GPP system, the Access Request message in the normal access process may not include the address information of the PDN GW, and the Access Request message in the handover process from the 3GPP access system to the Non-3GPP access system may include the address information of the PDN GW. After receiving the Access Request message, the Non-3GPP GW may determine whether the Access Request is a normal access request or an access request caused by handover according to whether the Access Request message includes the address information of the PDN GW.

(3) The handover process from the 3GPP access system to the Non-3GPP access system may be performed through a separate process rather than the Access process, for example, the UE may send to the Non-3GPP GW a 3GPP to Non-3GPP Handover Request message, requesting the Non-3GPP GW to perform the handover process from the 3GPP access system to the Non-3GPP access system.

It is not limited in the embodiment about how the Non-3GPP GW determines the received Access Request is a normal access request or an access request caused by handover.

4. An Access Authentication process may be performed among the UE, the Non-3GPP GW, and an HSS/AAA Server. In this process, the Non-3GPP GW may obtain the address information of the PDN GW for the UE.

5a. For a normal access process, the Non-3GPP GW may select a PDN GW for the UE according to a default Access Point Name (APN) in the Subscriber Data. For a handover access process, the Non-3GPP GW may use the PDN GW that was used by the UE in the 3GPP access system (the Non-3GPP GW may obtain the address information of the PDN GW from the HSS/AAA Server, or the HSS/AAA Server may send the stored address information of the PDN GW to the Non-3GPP GW). If the Non-3GPP GW and the PDN GW are interfaced using the PMIP protocol, the Non-3GPP GW may send a Proxy Binding Update message to the PDN GW. A flag may be included in the message to indicate the process type for updating binding. Specific measures for implementing the flag are similar to those in the second embodiment.

5b. If the UE and the PDN GW are interfaced using the Client Mobile Internet Protocol (CMIP) protocol, the UE may send a Binding Update message to the PDN GW. A flag may be included in the message to indicate the process type for updating binding. Specific measures for implementing the flag are provided below.

(1) The flag may be a "Binding Type" flag. The Binding Type flag may be set as "Initial Binding" for a normal access process, and may be set as "Handover Binding" for a handover access process.

(2) The flag may be a "Cause" value. The Cause value may be set as "Initial" for a normal access process, and may be set as "Handover" for a handover access process.

(3) The flag may be a "Handover Indication" flag. For a handover access process, the message sent by the UE may include the Handover Indication flag to indicate that the message is caused by a handover access. For a normal access process, the message sent by the UE does not include this flag.

(4) The flag may be an "Initial Indication" flag. For a normal access process, the message sent by the UE may include the Initial Indication flag to indicate that the message is caused by a normal access. For a handover access process, the message sent by the UE does not include this flag.

5c. This step may be performed as follows.

No modification is made in the Proxy Binding Update message or the Binding Update message. In the case of handover access, the Non-3GPP GW may send a Restore Service Request message to the PDN GW, to notify the PDN GW to restore the services used by the UE.

6. After receiving the Proxy Binding Update message or the Binding Update message, the PDN GW may determine the process type for updating binding according to the flag in the message, or the PDN GW may determine whether the Restore Service Request message is received, and then the PDN GW may perform different processes according to the process type for updating binding or according to whether the Restore Service Request message is received as follows.

(1) If the process type for updating binding in the Proxy Binding Update message or the Binding Update message indicates to update binding for a normal access, the PDN GW may inquire whether PCC rules for the UE exist in the PDN GW. If the PCC rules exist in the PDN GW, the PDN GW may delete the PCC rules for the UE while notifying a PCRF to delete the stored PCC rules. Meanwhile, the PDN GW may initiate a process for releasing resources in the source 3GPP access network, to release the resources in the source 3GPP access network.

(2) If the process type for updating binding in the Proxy Binding Update message or the Binding Update message indicates to update binding for a handover access or if the PDN GW receives a Restore Service Request message, the PDN GW may obtain the PCC rules for the UE stored in the PDN GW. The PDN GW may determine whether the PCC rules are dependent on the access type of an IP-CAN, if the PCC rules are dependent on the access type of the IP-CAN, the PDN GW may contact the PCRF to obtain modified PCC rules. Meanwhile, the PDN GW may initiate a process for releasing resources in the source 3GPP access network, to release the resources in the source 3GPP access network.

7a. If the Non-3GPP GW and the PDN GW are interfaced using the PMIP protocol, the PDN GW may send back a Proxy Binding ACK message to the Non-3GPP GW.

7b. If the UE and the PDN GW are interfaced using the CMIP protocol, the PDN GW may send back a Binding ACK message to the UE.

7c. If the PDN GW receives the Restore Service Request message from the Non-3GPP GW in previous step, the PDN GW may send back a Restore Service Response message to the Non-3GPP GW.

8. The Non-3GPP GW may send back an Access Accept message to the UE.

9. If the access process type is an access process caused by handover, the PDN GW may send to the Non-3GPP GW a PCC Rules Provision message, which provides the stored or modified PCC rules to the Non-3GPP GW. The Non-3GPP GW may store the received PCC rules and may send back a PCC Rules Provision ACK message to the PDN GW.

10. The Non-3GPP GW may initiate a Dedicated Bearer Activation process at the network side according to the received PCC rules, to create the dedicated bearer corresponding to the PCC rules, in other words, to create resources in the Non-3GPP system to be required for the services which are used by the UE in the source 3GPP access system.

The following should be noted.

(1) If the Non-3GPP GW and the PDN GW are implemented at a same entity, the messages between the Non-3GPP GW and the PDN GW become internal messages at the entity.

(2) Steps 7 and 9 are not necessarily performed in a fixed order; instead, they may be performed in any order.

(3) It is not limited in the embodiment about how the PDN GW sends the PCC rules to the Non-3GPP GW.

(4) In the case of no process type information for updating binding is included in the message, if the PDN GW finds that PCC rules for the UE are stored in the PDN GW after the PDN GW receives the message from the Non-3GPP GW, the PDN GW may send the stored PCC rules or the modified PCC rules (the PDN GW may contact the PCRF to obtain the modified PCC rules) to the Non-3GPP GW, and the Non-3GPP GW may initiate a Dedicated Bearer Activation process at the network side according to the received PCC rules, to create the dedicated bearer corresponding to the PCC rules, in other words, to create resources in the Non-3GPP system to be required for the services which are used by the UE in the source 3GPP access system.

Another solution is possible: for example, the first network element at network side may obtain the PDN GW address for the UE, and send a specific message to notify the Serving GW, and the Serving GW in turn may notify the PDN GW to perform different processes for the bearer.

Embodiment 4

Figure 6:
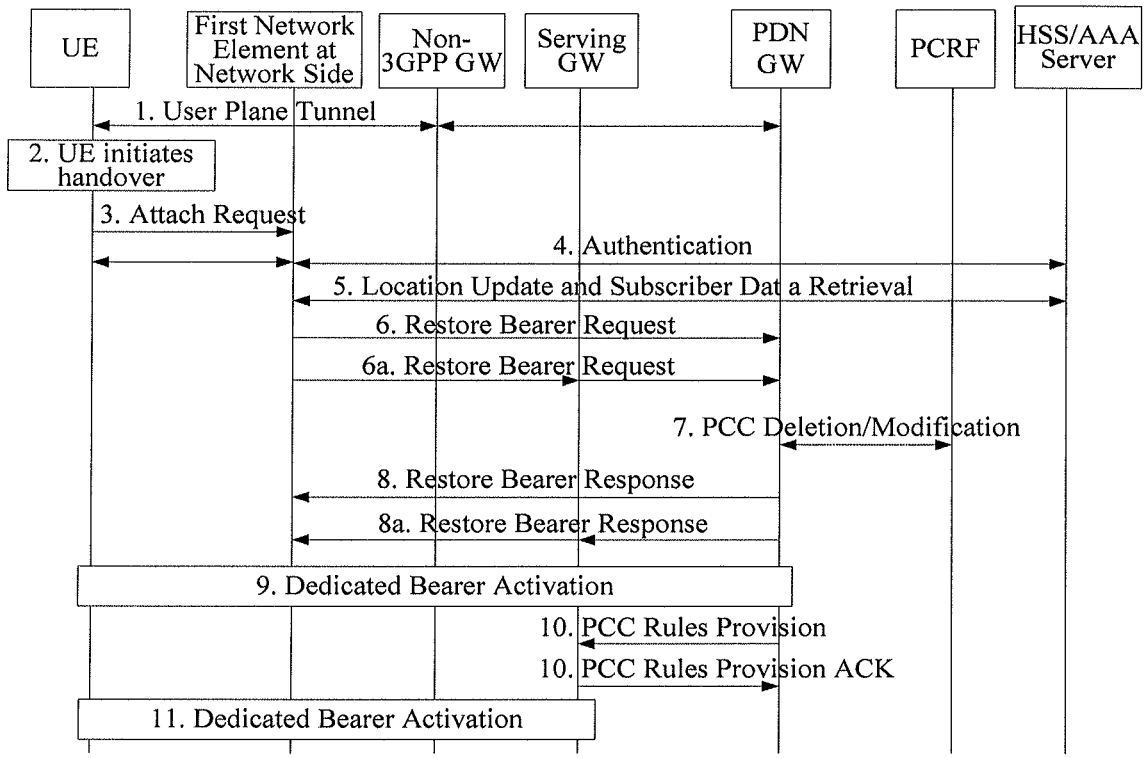
FIG. 6 is a flowchart illustrating a signaling interaction process for creating resources according to a fourth embodiment of the present invention.

A first network element at network side may send to a Serving GW a specific message, and the Serving GW may send to a PDN GW a specific message, notifying the PDN GW to restore bearer corresponding to services used by a UE. Alternatively, the first network element at network side may send to the PDN GW a specific message which includes address information of the Serving GW used by the UE, notifying the PDN GW to create resources corresponding to services used by the UE. FIG. 6 illustrates a specific process including the following steps.

1. A UE may get access to a Non-3GPP access network though a Non-3GPP GW and a PDN GW.

2. The UE may initiate a handover from the Non-3GPP access system to a 3GPP access system.

3. The UE may send to the first network element at network side an Attach Request message for performing a handover process from the Non-3GPP access system to the 3GPP access system. The first network element at network side may be an MME in a SAE system, and may be an SGSN in a GPRS/UMTS system.

4. An Authentication process may be performed among the UE, the first network element at network side, and an HSS/AAA Server.

5. A Location Update and Subscriber Data Retrieval process may be performed between the first network element at network side and the HSS/AAA Server. In this process, the first network element at network side may obtain the address information of the PDN GW used by the UE in the Non-3GPP access system.

6. For a handover access process, the first network element at network side may use the PDN GW that was used by the UE in the Non-3GPP access system (the first network element at network side may obtain the address information of the PDN GW from the HSS/AAA Server, or the HSS/AAA Server may send the stored address information of the PDN GW to the first network element at network side). The first network element at network side may send to the PDN GW a Restore Bearer Request (or a Restore PDP Context Request) message which includes the address information of the Serving GW used by the UE, notifying the PDN GW to create resources corresponding to services used by the UE.

6a. If there is no interface between the first network element at network side and the PDN GW, the Restore Bearer Request (or Restore PDP Context Request) message may be forwarded to the PDN GW via the Serving GW.

(1) The first network element at network side may send to the Serving GW a respective Restore Bearer Request (or Restore PDP Context Request) message for each PDN GW used by the UE, each message including the address information of an individual PDN GW used by the UE.

(2) The first network element at network side may send to the Serving GW one Restore Bearer Request (or Restore PDP Context Request) message for all PDN GWs used by the UE, the message including the address information of all the PDN GWs used by the UE.

7. After receiving the Restore Bearer Request (or Restore PDP Context Request) message, the PDN GW may obtain the address information of the Serving GW included in the message. In subsequent process for handling resources, the PDN GW may send related messages to the Serving GW. The process of the PDN GW is similar to that as depicted in former embodiment. Meanwhile, the PDN GW may initiate a process for releasing resources in the source Non-3GPP access network, to release the resources in the source Non-3GPP access network.

8. The PDN GW may send back a Restore Bearer Response (or a Restore PDP Context Response) message to the first network element at network side.

8a. If there is no interface between the first network element at network side and the PDN GW, the Restore Bearer Response (or Restore PDP Context Response) message may be forwarded to the first network element at network side via the Serving GW.

9. If the access process type is an access process caused by handover and the Serving GW and the PDN GW are interfaced using the GTP protocol, the PDN GW may initiate a Dedicated Bearer Activation process at the network side according to the stored or modified PCC rules, to create the dedicated bearer corresponding to the PCC rules, in other words, to create resources in the 3GPP system to be required for the services which are used by the UE in the source Non-3GPP access system 10. If the access process type is an access process caused by handover and the Serving GW and the PDN GW are interfaced using the PMIP protocol, the PDN GW may send to the Serving GW a PCC Rules Provision message, which provides the stored or modified PCC rules to the Serving GW. The Serving GW may store the received PCC rules and may send back a PCC Rules Provision ACK message to the PDN GW.

11. The Serving GW may initiate a Dedicated Bearer Activation process at the network side according to the received PCC rules, to create the dedicated bearer corresponding to the PCC rules, in other words, to create resources in the 3GPP system to be required for the services which are used by the UE in the source Non-3GPP access system.

The following should be noted.

(1) If the Serving GW and the PDN GW are implemented at a same entity, the messages between the Serving GW and the PDN GW become internal messages at the entity.

(2) Steps 8 and 9 are not necessarily performed in a fixed order; instead, they may be performed in any order.

(3) It is not limited in the embodiment about how the PDN GW sends the PCC rules to the Serving GW.

Embodiment 5

Figure 7:
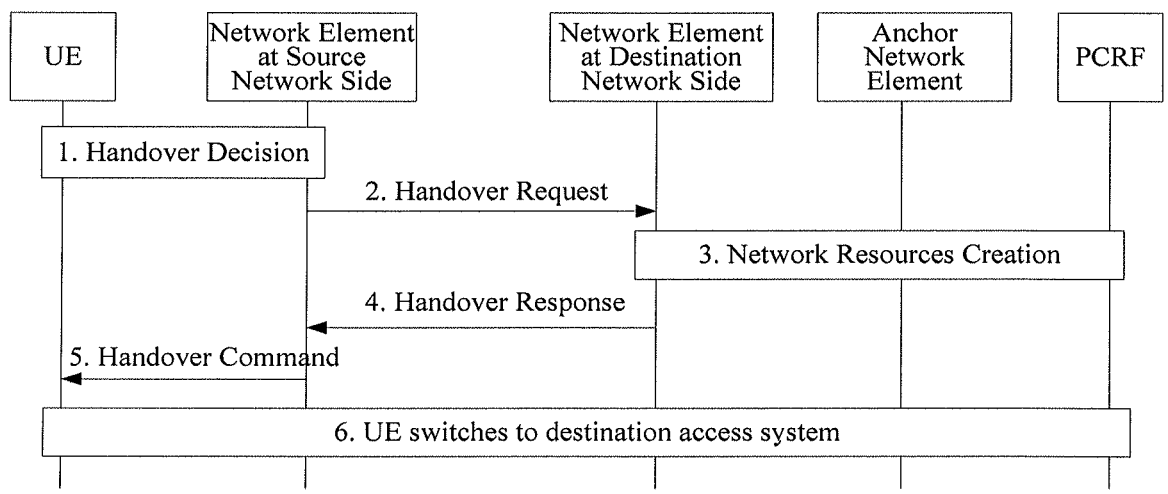
FIG. 7 is a flowchart illustrating a signaling interaction process for creating resources according to a fifth embodiment of the present invention.

A network element at source network side may send to a network element at destination network side a Handover Request message, which includes address information of Anchor Gateways (Anchor GWs) used by the UE in the source system. After receiving the address information of the Anchor GWs, the network element at destination network side may notify these Anchor GWs to perform resources creating process. FIG. 7 illustrates a specific process including the following steps.

1. A source access system may decide to initiate a handover for a UE to a destination access system.

2. A network element at source network side may send to a network element at destination network side a Handover Request message, which includes address information of Anchor GWs used by the UE in the source access system (e.g., the message may include an Anchor GW Address List including address information of each Anchor GWs used by the UE). If the source/destination access system is a GPRS/UMTS system, the network element at source/destination network side may be an SGSN; if the source/destination access system is an SAE system, the network element at source/destination network side may be an MME; if the source/destination access system is a WLAN system, the network element at source/destination network side may be an Evolved Packet Data Gateway (EPDG); if the source/destination access system is a Wimax system, the network element at source/destination network side may be an Access Service Network Gateway (ASN GW); if the source/destination access system is a CDMA system, the network element at source/destination network side may be an Access Gateway (AGW).

3. The network element at destination network side may obtain the address information of Anchor GWs used by the UE in the source access system from the Handover Request message, and notify the Anchor GWs to perform the resources creating process, in other words, to perform the resources reserving process. The particular process is similar to that depicted in above embodiments, and is not detailed herein.

4. The network element at destination network side may send back a Handover Response message to the network element at source network side.

5. The network element at source network side may notify the UE to switch to the destination access system.

6. The UE may switch to the destination access system.

Embodiment 6

Figure 8:
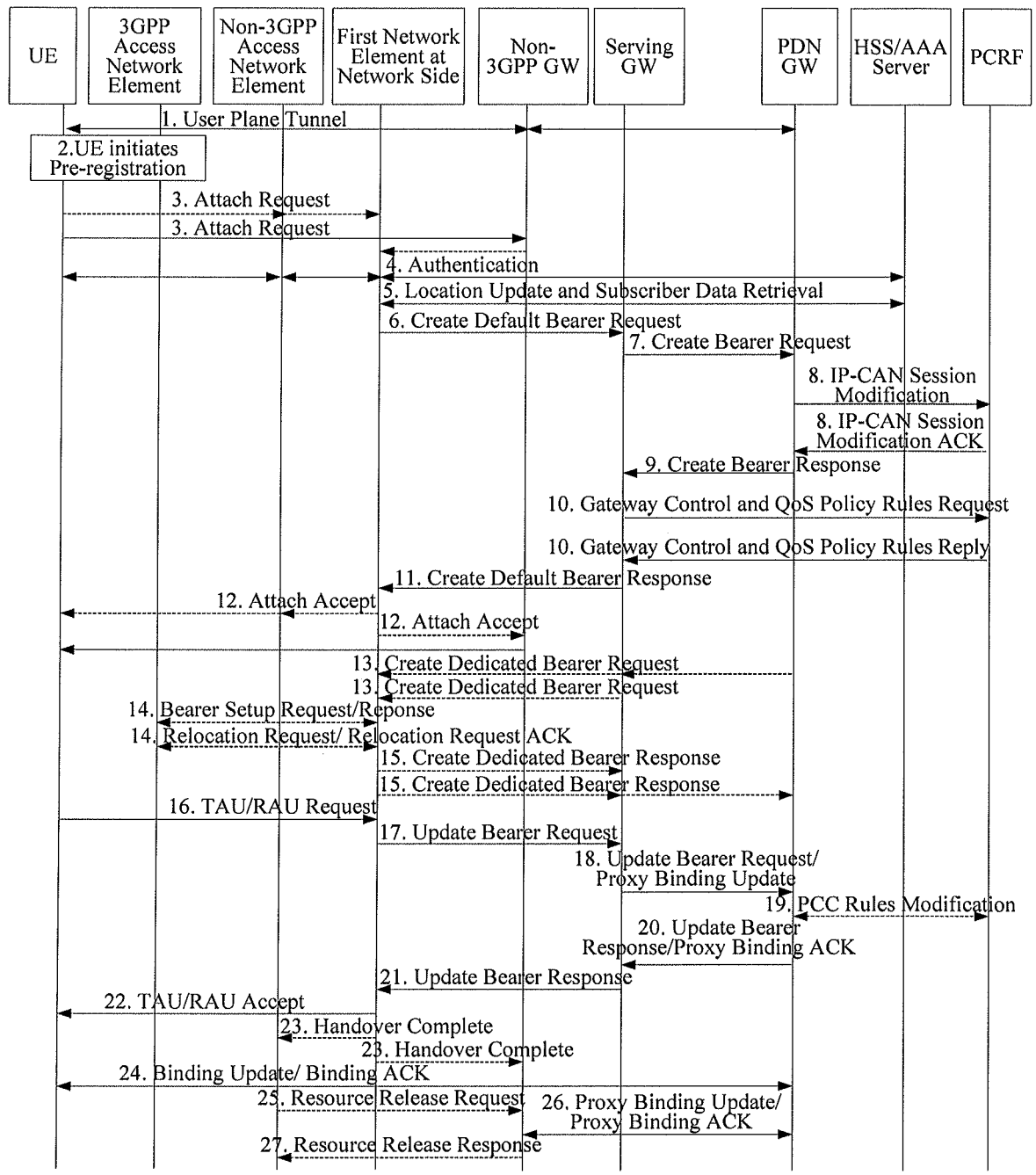
FIG. 8 is a flowchart illustrating a signaling interaction process for creating resources according to a sixth embodiment of the present invention.

When a UE is still located in a Non-3GPP network, the UE may initiate a Pre-registration or Optimized Handover process to a 3GPP access network via the Non-3GPP network. A first network element at network side in the 3GPP access network may send to a Serving GW a Create Default Bearer Request (or a Create Default PDP Context Request) message, which includes a flag to indicate the process type for creating bearer (or Creating PDP context), for example, the process type may be a Pre-registration process type or an Optimized Handover process type between the Non-3GPP network and the 3GPP network. After receiving the message, the Serving GW may perform the resources creating process according to the flag. FIG. 8 illustrates a specific process including the following steps.

1. A UE may access to a Non-3GPP access network though a Non-3GPP GW and a PDN GW.

2. The UE may initiate a Pre-registration process or an Optimized Handover process to a 3GPP network.

3. The UE may send to a first network element at network side via the Non-3GPP access network an Attach Request message, for performing the Pre-registration process or the Optimized Handover process to the 3GPP network. The first network element at network side may be an MME in an SAE system, and may be an SGSN in a GPRS/UMTS system.

The Attach Request message sent by the UE may include a flag to indicate the first network element at network side whether this Attach Request message is caused by a Pre-registration process or an Optimized Handover process for the UE. Specific measures for implementing the flag are provided below.

(1) The flag may be an "Attach Type" flag field. The UE may set the Attach Type flag as "Pre-registration Attach" or "Optimized Handover Attach".

(2) The flag may be a "Pre-registration Indication" or "Optimized Handover Indication" flag field.

(3) The flag may be a "Cause" value. The UE may set the Cause value as "Pre-registration" or "Optimized Handover".

If no flag is included in the Attach Request message from the UE and the first network element at network side determines that the Attach Request message is received from the Non-3GPP access network, the first network element at network side may deem that the received Attach Request message is caused by the Pre-registration process or Optimized Handover process for the UE.

4. An Authentication process may be performed among the UE, the first network element at network side, and an HSS/AAA Server.

5. A Location Update and Subscriber Data Retrieval process may be performed between the first network element at network side and the HSS/AAA Server. In this process, the first network element at network side may obtain the address information of the PDN GW used by the UE in the Non-3GPP access system.

6. The first network element at network side may select the PDN GW that was used by the UE in the Non-3GPP access system (the first network element at network side may obtain the address information of the PDN GW from the HSS/AAA Server, or the HSS/AAA Server may send the stored address information of the PDN GW to the first network element at network side). If the 3GPP system is an SAE system, the first network element at network side may send a Create Default Bearer Request message to the Serving GW; if the 3GPP system is a GPRS/UMTS system, the first network element at network side may send a Create Default PDP Context Request message to the Serving GW. A flag may be included in the message to indicate the process type for creating bearer, for example, the process type may be a Pre-registration process type or an Optimized Handover process type. Specific measures for implementing the flag are provided as follows.

(1) The flag may be a "Create Type" flag. The MME may set the Create Type flag as "Pre-registration" or "Optimized Handover".

(2) The flag may be a "Cause" value. The MME may set the Cause value as "Pre-registration" or "Optimized Handover".

(3) The flag may be a "Pre-registration Indication" or "Optimized Handover Indication" flag.

7. If the Serving GW and the PDN GW are interfaced using the GTP protocol, the Serving GW may send a Create Bearer Request message or a Create PDP Context Request message to the PDN GW after the Serving GW receives the message from the first network element at network side. A flag may be included in the message to indicate the process type for creating bearer (a Pre-registration process type or an Optimized Handover process type). Specific measures for implementing the flag are provided below.

(1) The flag may be a "Create Type" flag. The Serving GW may set the Create Type flag as "Pre-registration" or "Optimized Handover".

(2) The flag may be a "Cause" value. The Serving GW may set the Cause value as "Pre-registration" or "Optimized Handover".

(3) The flag may be a "Pre-registration Indication" or "Optimized Handover Indication" flag.

8. After receiving the Create Bearer Request message, the PDN GW may obtain PCC rules for the UE stored in the PDN GW. The PDN GW may determine whether the PCC rules are dependent on the access type of an IP-CAN, if the PCC rules are dependent on the access type of the IP-CAN, the PDN GW may contact the PCRF to obtain modified PCC rules.

When receiving the Create Bearer Request message for the Pre-registration or the Optimized Handover, the PDN GW does not switch user plane path, in other words, the downlink user plane path of the PDN GW still directs to the Non-3GPP access network. Meanwhile, the PDN GW may reserve the resources in the Non-3GPP access network.

9. The PDN GW may send back a Create Bearer Response or a Create PDP Context Response message to the Serving GW.

10. If the Serving GW and the PDN GW are interfaced using the PMIP protocol, the Serving GW may, after receiving the message in the step 6, send to the PCRF a Gateway Control and QoS Policy Rules Request message, to obtain the PCC rules to be used by the UE in the 3GPP access network. The PCRF may send to the Serving GW a Gateway Control and QoS Policy Rules Reply message, which includes the PCC rules to be used by the UE in the 3GPP access network. Meanwhile, the Serving GW does not send a Proxy Binding Update message to the PDN GW, in other words, the Serving GW does not notify the PDN GW to switch the user plane path to the Serving GW.

11. The Serving GW may send back a Create Default Bearer Response message or a Create Default PDP Context Response message to the MME.

12. The MME may send back an Attach Accept message to the UE.

13. If the Serving GW and the PDN GW are interfaced using the GTP protocol, the PDN GW may send a Create Dedicated Bearer Request message to the first network element at network side, to initiate a Dedicated Bearer Activation process at the network side according to the stored or obtained PCC rules and create the dedicated bearer corresponding to the PCC rules, in other words, to create resources in the 3GPP system to be required for the services which are used by the UE in the source Non-3GPP access system. If the Serving GW and the PDN GW are interfaced using the PMIP protocol, the Serving GW may send a Create Dedicated Bearer Request message to the first network element at network side, to initiate a Dedicated Bearer Activation process at the network side according to the obtained PCC rules and create the dedicated bearer corresponding to the PCC rules. A flag may be included in the Create Dedicated Bearer Request message to indicate the process type for creating bearer (a Pre-registration process type or an Optimized Handover process type). Specific measures for implementing the flag are provided below.

(1) The flag may be a "Create Type" flag. The Serving GW or the PDN GW may set the Create Type flag as "Pre-registration" or "Optimized Handover".

(2) The flag may be a "Cause" value. The Serving GW or the PDN GW may set the Cause value as "Pre-registration" or "Optimized Handover".

(3) The flag may be a "Pre-registration Indication" or "Optimized Handover Indication" flag.

14. The first network element at network side may send to a 3GPP access network element a Bearer Setup Request message, requesting the 3GPP access network element to set up the radio bearer. If the first network element at network side finds that the radio bearer setup is caused by the Pre-registration or the Optimized Handover, the Bearer Setup Request message sent by the first network element at network side may include a flag to indicate the process type of the bearer setup (a Pre-registration process type or an Optimized Handover process type). Specific measures for implementing the flag are provided below.

(1) The flag may be a "Setup Type" flag. The first network element at network side may set the Setup Type flag as "Pre-registration" or "Optimized Handover".

(2) The flag may be a "Cause" value. The first network element at network side may set the Cause value as "Pre-registration" or "Optimized Handover".

(3) The flag may be a "Pre-registration Indication" flag or an "Optimized Handover Indication" flag.

Alternatively, the first network element at network side may send to the 3GPP access network element a Relocation Request message, requesting the 3GPP access network element to set up the radio bearer.

After receiving the message, the 3GPP access network element may setup bearer resources between the 3GPP access network element and the Serving GW. If the 3GPP access network element finds that the Bearer Setup Request is caused by the Pre-registration or the Optimized Handover, the 3GPP access network element does not notify the UE to set up the Radio Bearer resources. Then the 3GPP access network element may send back a Bearer Setup Response message to the first network element at network side.

15. The first network element at network side may send back a Create Dedicated Bearer Response message to the Serving GW or the PDN GW.

16. The UE may move into the 3GPP access network, and send to the first network element at network side a Track Area Update (TAU) or Route Area Update (RAU) Request message, to indicate the first network element at network side that the UE has handed over to the 3GPP access network. The UE may indicate the first network element at network side that the UE has handed over to the 3GPP access network through other message, such as Service Request message.

17. The first network element at network side may send to the Serving GW an Update Bearer Request message or an Update PDP Context Request message. The Update Bearer Request message or the Update PDP Context Request message sent by the first network element at network side may include a flag to indicate the PDN GW not to initiate a process for releasing resources for the UE in the source Non-3GPP access network. The flag may be an Optimized Handover flag, or a Pre-registration flag, or a Resource not Release flag. Specific measures for implementing the flag are provided below.

(1) The flag may be an "Update Type" flag. The first network element at network side may set the Update Type flag as "Pre-registration" or "Optimized Handover".

(2) The flag may be a "Cause" value. The first network element at network side may set the Cause value as "Pre-registration", or "Optimized Handover", or "Resource not Release".

(3) The flag may be a "Pre-registration Indication" flag, or an "Optimized Handover Indication" flag, or a "Resource not Release Indication" flag.

18. If the Serving GW and the PDN GW are interfaced using the GTP protocol, the Serving GW may send an Update Bearer Request message or an Update PDP Context Request message to the PDN GW. If the Serving GW and the PDN GW are interfaced using the PMIP protocol, the Serving GW may send a Proxy Binding Update message to the PDN GW. The Update Bearer Request or the Update PDP Context Request or the Proxy Binding Update message sent by the Serving GW may include a flag to indicate the PDN GW not to initiate a process for releasing resources for the UE in the source Non-3GPP access network. The flag may be an Optimized Handover flag, or a Pre-registration flag, or a Resource not Release flag. Specific measures for implementing the flag may be as follows.

(1) The flag may be an "Update Type" flag or a "Binding Type" flag. The Serving GW may set the Update Type flag or the Binding Type flag as "Pre-registration" or "Optimized Handover".

(2) The flag may be a "Cause" value. The Serving GW may set the Cause value as "Pre-registration", or "Optimized Handover", or "Resource not Release".

(3) The flag may be a "Pre-registration Indication" flag, or an "Optimized Handover Indication" flag, or a "Resource not Release Indication" flag.

19. After receiving the Update Bearer Request/Proxy Binding Update message, the PDN GW may obtain PCC rules for the UE stored in the PDN GW. If the PDN GW receives the Proxy Binding Update message from the Serving GW, the PDN GW may determine whether the PCC rules are dependent on the access type of an IP-CAN, if the PCC rules are dependent on the access type of the IP-CAN, the PDN GW may send to the PCRF an IP-CAN Session Modification Request message, to obtain the PCC rules used by the UE in the 3GPP access network. The PCRF may send back to the PDN GW an IP-CAN Session Modification ACK message, which includes the PCC rules used by the UE in the 3GPP access network. If the message sent from the Serving GW indicates the PDN GW not to initiate a process for releasing resources for the UE in the source Non-3GPP access network, the PDN GW does not initiate the process for releasing resources for the UE in the source Non-3GPP access network. In other words, the process for releasing resources in the source Non-3GPP access network is not triggered by the PDN GW.

20. The PDN GW may send back an Update Bearer Response message or an Update PDP Context Response message or a Proxy Binding ACK message to the Serving GW.

21. The Serving GW may send back an Update Bearer Response message or an Update PDP Context Response message to the first network element at network side.

22. The first network element at network side may send back a TAU or RAU Accept message to the UE.

23. After the first network element at network side receives a message indicating that the UE has switched to the destination access network, if the first network element at network side finds that the Pre-registration or Optimized Handover process has been performed for the UE, the first network element at network side may send back a Handover Complete message to the Non-3GPP network element.

24. If the UE and the PDN GW are interfaced using the CMIP protocol, the UE may send a Binding Update message to the PDN GW. The Binding Update message sent by the UE may include a flag to indicate the PDN GW not to initiate a process for releasing resources for the UE in the source Non-3GPP access network. The flag may be an Optimized Handover flag, or a Pre-registration flag, or a Resource not Release flag. Specific measures for implementing the flag may be as follows.

(1) The flag may be an "Update Type" flag or a "Binding Type" flag. The UE may set the Update Type flag or the Binding Type flag as "Pre-registration" or "Optimized Handover".

(2) The flag may be a "Cause" value. The UE may set the Cause value as "Pre-registration", or "Optimized Handover", or "Resource not Release".

(3) The flag may be a "Pre-registration Indication" flag, or an "Optimized Handover Indication" flag, or a "Resource not Release Indication" flag.

After receiving the Binding Update message, the PDN GW does not initiate the process for releasing resources for the UE in the source Non-3GPP access network, in other words, the process for releasing resources in the source Non-3GPP access network is not triggered by the PDN GW. For example, there may be two ways for the PDN GW to release the resources in the source Non-3GPP access network (e.g., the Binding Cache entry resources in the source Non-3GPP access network).

(1) The PDN GW may locally release the resources in the source Non-3GPP access network without receiving a resource releasing notification from the Non-3GPP GW.

(2) The PDN GW does not release the resources in the source Non-3GPP access network unless receiving the resource releasing notification from the Non-3GPP GW.

25. After receiving the Handover Complete message from the first network element at network side, the Non-3GPP access network element (the access network element in the Non-3GPP access network or the Non-3GPP GW) may initiate a process for releasing resources in the source Non-3GPP access network, in other words, the process for releasing resources in the source Non-3GPP access network is triggered by the access network element in the Non-3GPP access network or the Non-3GPP GW. If it is the access network element in the Non-3GPP access network that initiate the process for releasing resources in the source Non-3GPP access network, the message (e.g., a Resource Release Request message, and specific implementation of the message depends on the specific Non-3GPP access network) sent from the access network element in the Non-3GPP access network to the Non-3GPP GW may include a flag to indicate that this resource releasing process is caused by handover from the Non-3GPP access network to the 3GPP access network. Specific measures for implementing the flag may be as follows.

(1) The flag may be a "Release Type" flag. The access network element in the Non-3GPP access network may set the Release Type flag as "inter Radio Access Technology (RAT) Handover from Non-3GPP to 3GPP".

(2) The flag may be a "Cause" value. The access network element in the Non-3GPP access network may set the Cause value as "inter RAT Handover from Non-3GPP to 3GPP".

(3) The flag may be an "Isomerous network Handover Indication (INHI)" flag.

26. If the PDN GW does not release the resources unless receiving a notification from the Non-3GPP GW, the Non-3GPP GW may send a Proxy Binding Update message to the PDN GW. The Proxy Binding Update message may include a flag to indicate that this Proxy Binding Update message is caused by handover from the Non-3GPP access network to the 3GPP access network. Specific measures for implementing the flag may be as follows.

(1) The flag may be a "Binding Type" flag. The Non-3GPP GW may set the Binding Type flag as "inter RAT Handover from Non-3GPP to 3GPP".

(2) The flag may be a "Cause" value. The Non-3GPP GW may set the Cause value as "inter RAT Handover from Non-3GPP to 3GPP".

(3) The flag may be an "INHI" flag.

After receiving the Proxy Binding Update message, the PDN GW may release the resources (e.g., Binding Cache entry) in the source Non-3GPP access network, and reserve the resources (e.g., bearer resources or Binding Cache entry resources in the 3GPP access network, IP address allocated by the PDN GW for the UE, and so on) in the destination 3GPP access network, without indicating the PCRF that the resources have been released.

The PDN GW may send back a Proxy Binding ACK message to the Non-3GPP GW.

27. The Non-3GPP GW may send back a Resource Release Response message to the access network element in the Non-3GPP access network.

The following should be noted.

(1) If the Serving GW and the PDN GW are implemented at a same entity, the messages between the Serving GW and the PDN GW become internal messages at the entity.

(2) Steps 12 and 13 are not necessarily performed in fixed order; instead, they may be performed in any order, so do steps 16 and 25.

(3) In the case that no process type for creating bearer is included in the message, if the PDN GW finds that PCC rules for the UE are stored in the PDN GW after the PDN GW receives the message from the Serving GW, the PDN GW may initiate a Dedicated Bearer Activation process at the network side according to the stored PCC rules or the modified PCC rules (the PDN GW may contact the PCRF to obtain the modified PCC rules), to create the dedicated bearer corresponding to the PCC rules, in other words, to create resources in the 3GPP system to be required for the services which are used by the UE in the source Non-3GPP access system. Meanwhile, the PDN GW may initiate a process for releasing resources in the source Non-3GPP access network (in other word, the process for releasing resources in the Non-3GPP access network is triggered by the PDN GW), to release the resources in the source Non-3GPP access network.

Alternatively, if the Serving GW obtains the PCC rules from the PCRF, the Serving GW may initiate a Dedicated Bearer Activation process at the network side according to the obtained PCC rules, to create the resources corresponding to the PCC rules, in other words, to create resources in the 3GPP system to be required for the services which are used by the UE in the source Non-3GPP access system.

Embodiment 7

Figure 9:
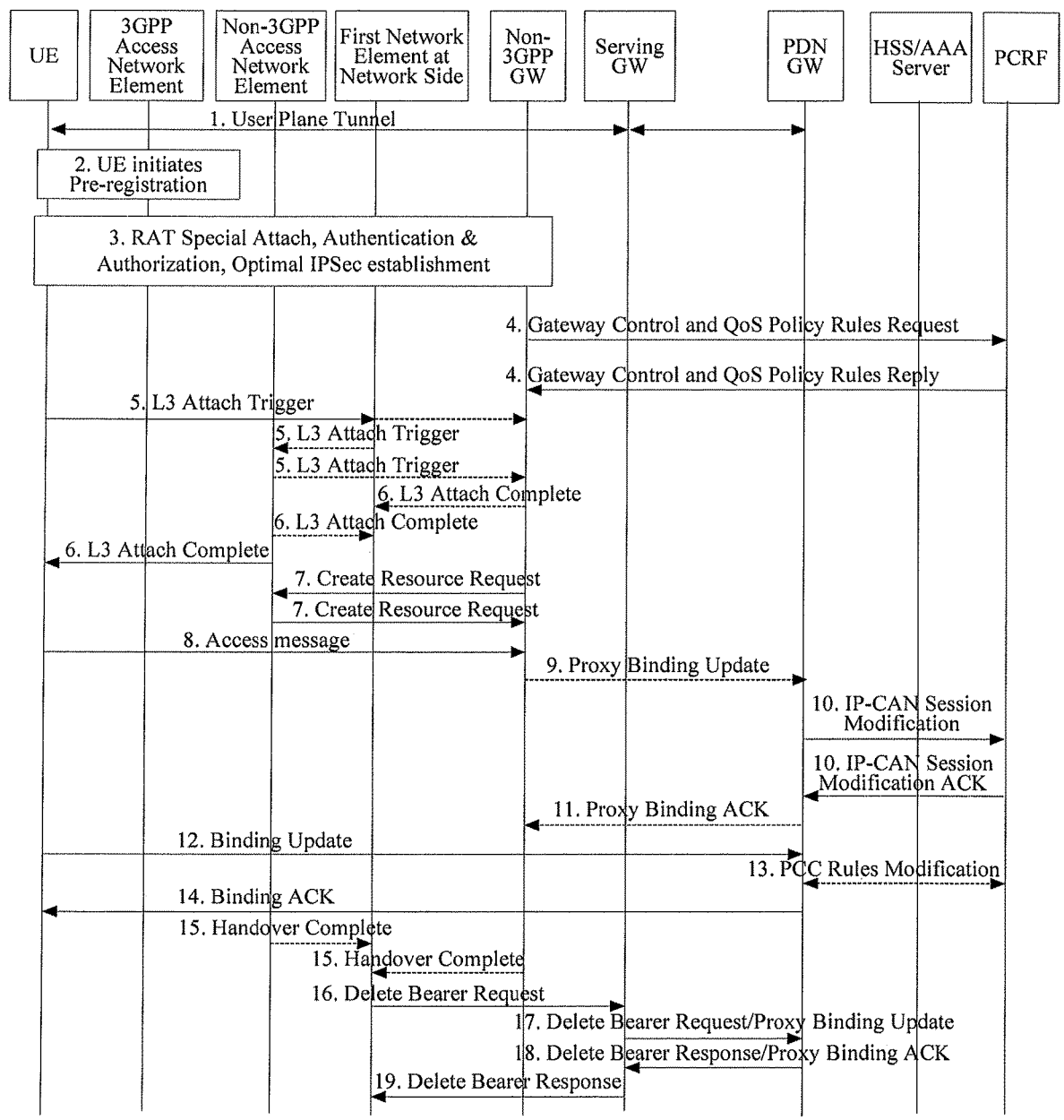
FIG. 9 is a flowchart illustrating a signaling interaction process for creating resources according to a seventh embodiment of the present invention.

When a UE is still located in a 3GPP network, the UE may initiate a Pre-registration or Optimized Handover process to a Non-3GPP network via the 3GPP network. A Non-3GPP access network element may send to a Non-3GPP GW a Create Access Request message, which includes a flag to indicate the process type of the Access Request, for example, the process type may be a Pre-registration process type or an Optimized Handover process type between Non-3GPP network and the 3GPP network. After receiving the message, the Non-3GPP GW may perform the resources creating process according to the flag. FIG. 9 illustrates a specific process including the following steps.

1. A UE may have registered in a 3GPP access network.

2. The UE may initiate a Pre-registration process or an Optimized Handover process to a Non-3GPP network.

3. The UE may perform a specific Attach process, an Authentication and Authorization process with the Non-3GPP access network via the 3GPP access network. If necessary, the UE may perform an IPSec Tunnel Establishment process. The Non-3GPP GW in this step may be an Evolved Packet Data Gateway (EPDG) in a WLAN system, may be an Access Service Network Gateway (ASN GW) in a Wimax system, may be an Access Gateway (AGW) in a CDMA system, and may be a Packet Data Serving Node (PDSN) in a HRPD system.

A message sent by the UE in this step may include a flag to indicate that this step is caused by a Pre-registration process or an Inter-System Optimized Handover process from the 3GPP access network to the Non-3GPP access network. Specific measures for implementing the flag are provided below.

(1) The flag may be an "Attach Type" field. The UE may set the Attach Type field as "Pre-registration Attach" or "Optimized Handover Attach".

(2) The flag may be a "Pre-registration Indication" or "Optimized Handover Indication" field.

(3) The flag may be a "Cause" value. The UE may set the Cause value as "Pre-registration" or "Optimized Handover".

If no Pre-registration flag or Optimized Handover flag is included in the message of this step from the UE and the network element of the Non-3GPP access network finds that the message of this step is sent from the first network element at network side of the 3GPP access network, the network element of the Non-3GPP access network may deem that the specific Attach process to the Non-3GPP access network is caused by the Pre-registration process or the Inter-System Optimized Handover process from 3GPP access network to the Non-3GPP access network.

If the access network element of the Non-3GPP access network identifies the access type (Pre-registration or Optimized Handover) of the UE in this step, the access network element of the Non-3GPP access network may send to the Non-3GPP GW a message which includes a flag to indicate the access type of the UE. Specific measures for implementing the flag are provided below.

(1) The flag may be an "Attach Type" field. The Non-3GPP access network element may set the Attach Type field as "Pre-registration Attach" or "Optimized Handover Attach".

(2) The flag may be a "Pre-registration Indication" or "Optimized Handover Indication" field.

(3) The flag may be a "Cause" value. The Non-3GPP access network element may set the Cause value as "Pre-registration" or "Optimized Handover".

4. The Non-3GPP GW may send to a PCRF a Gateway Control and QoS Policy Rules Request message, to obtain the PCC rules to be used by the UE in the Non-3GPP access network. The PCRF may send back to the Non-3GPP GW a Gateway Control and QoS Policy Rules Reply message, which includes the PCC rules to be used by the UE in the Non-3GPP access network.

5. The UE may trigger a Layer 3 (L3) Attach process to the Non-3GPP access network via the 3GPP access network.

The message sent by the UE in this step may include a flag to indicate that this step is caused by a Pre-registration process or an Inter-System Optimized Handover process from the 3GPP access network to the Non-3GPP access network. Specific measures for implementing the flag are similar to those depicted in step 2.

If no Pre-registration flag or Optimized Handover flag is included in the message of this step from the UE and the network element of the Non-3GPP access network finds that the message of this step is sent from the first network element at network side of the 3GPP access network, the network element of the Non-3GPP access network may deem that the specific Attach process to the Non-3GPP access network is caused by the Pre-registration process or the Inter-System Optimized Handover process from the 3GPP access network to the Non-3GPP access network.

If the access network element of the Non-3GPP access network identifies the access type (Pre-registration or Optimized Handover) of the UE in this step, the access network element of the Non-3GPP access network may send to the Non-3GPP GW a message which includes a flag to indicate the access type of the UE. Specific measures for implementing the flag are similar to those depicted in step 2.

6. The Non-3GPP GW or the access network element of the Non-3GPP access network may indicate that the L3 Attach process of the UE is completed.

7. The Non-3GPP GW may send a Create Resource Request message to the access network element of the Non-3GPP access network, to initiate a Dedicated Bearer Activation process at the network side according to the obtained PCC rules and create the resources corresponding to the PCC rules. A flag may be included in the message to indicate the process type of the resource creating (Pre-registration process type or Optimized Handover process type). Specific measures for implementing the flag are provided below.

(1) The flag may be a "Create Type" flag. The Non-3GPP GW may set the Create Type flag as "Pre-registration" or "Optimized Handover".

(2) The flag may be a "Cause" value. The Non-3GPP GW may set the Cause value as "Pre-registration" or "Optimized Handover".

(3) The flag may be a "Pre-registration Indication" flag or an "Optimized Handover Indication" flag.

After receiving the message, the access network element of the Non-3GPP access network may create resources between the access network element and the Non-3GPP GW. If the access network element of the Non-3GPP access network identifies that this Create Resource Request is caused by a Pre-registration process or an Optimized Handover process, the access network element of the Non-3GPP access network does not notify the UE to create Radio Resources. The Non-3GPP access network element may send back a Create Resource Response message to the Non-3GPP GW.

8. If the Non-3GPP GW and the PDN GW are interfaced using the PMIP protocol and the Non-3GPP GW identifies that the access type of the UE is the Pre-registration or Optimized Handover, the Non-3GPP GW does not send a Proxy Binding Update message to the PDN GW when the Non-3GPP GW receives the message in the L3 Attach process, in other words, the Non-3GPP GW does not notify the PDN GW to switch the downlink user plane path to the Serving GW.

The UE may move into the Non-3GPP access network, and send an access message related to the Non-3GPP access network to the Non-3GPP GW via the access network element of the Non-3GPP access network.

9. If the Non-3GPP GW and the PDN GW are interfaced using the PMIP protocol, the Non-3GPP GW may send a Proxy Binding Update message to the PDN GW.

The Proxy Binding Update message sent by the Non-3GPP GW may include a flag to indicate the PDN GW not to initiate a process for releasing resources for the UE in the source 3GPP access network. The flag may be an Optimized Handover flag, or a Pre-registration flag, or a Resource not Release flag. Specific measures for implementing the flag are provided below.

(1) The flag may be an "Update Type" or "Binding Type" flag. The Non-3GPP GW may set the Update Type or Binding Type flag as "Pre-registration" or "Optimized Handover".

(2) The flag may be a "Cause" value. The Non-3GPP GW may set the Cause value as "Pre-registration", or "Optimized Handover", or "Resource not Release".

(3) The flag may be a "Pre-registration Indication" flag, or an "Optimized Handover Indication" flag, or a "Resource not Release Indication" flag.

10. After receiving the Proxy Binding Update message, the PDN GW may obtain PCC rules for the UE stored in the PDN GW. The PDN GW may determine whether the PCC rules are dependent on the access type of an IP-CAN. If the PCC rules are dependent on the access type of the IP-CAN, the PDN GW may send to the PCRF an IP-CAN Session Modification Request message to obtain the PCC rules to be used by the UE in the Non-3GPP access network. The PCRF may send back to the PDN GW an IP-CAN Session Modification ACK message, which includes the PCC rules to be used by the UE in the Non-3GPP access network.

If the message sent from the Non-3GPP GW indicates the PDN GW not to initiate a process for releasing resources for the UE in the source 3GPP access network, the PDN GW does not initiate the process for releasing resources for the UE in the source 3GPP access network. In other words, the process for releasing resources in the source 3GPP access network is not triggered by the PDN GW. For example, there may be two ways for the PDN GW to release the resources (e.g., Binding Cache entry resources or Bearer Context resources in the source 3GPP access network) in the source 3GPP access network.

(1) The PDN GW may locally release the resources in the source 3GPP access network without receiving a resource releasing notification from the Serving GW.

(2) The PDN GW does not release the resources in the source 3GPP access network unless receiving the resource releasing notification from the Serving GW.

11. The PDN GW may send back a Proxy Binding ACK message to the Non-3GPP GW.

12. If the UE and the PDN GW are interfaced using the CMIP protocol, the UE may send a Binding Update message to the PDN GW.

The Binding Update message sent by the UE may include a flag to indicate the PDN GW not to initiate a process for releasing resources for the UE in the source 3GPP access network. The flag may be an Optimized Handover flag, or a Pre-registration flag, or a Resource not Release flag. Specific measures for implementing the flag are similar to those depicted in the sixth embodiment.

After receiving the Binding Update message, the PDN GW does not initiate the process for releasing resources for the UE in the source 3GPP access network; in other words, the process for releasing resources in the source 3GPP access network is not triggered by the PDN GW. For example, there may be two ways for the PDN GW to release the resources (e.g., Binding Cache entry resources or Bearer Context resources in the source 3GPP access network) in the source 3GPP access network.

(1) The PDN GW may locally release the resources in the source 3GPP access network without receiving a resource releasing notification from the Serving GW.

(2) The PDN GW does not release the resources in the source 3GPP access network unless receiving the resource releasing notification from the Serving GW.

13. After receiving the Binding Update message, the PDN GW may obtain PCC rules for the UE stored in the PDN GW. The PDN GW may determine whether the PCC rules are dependent on the access type of an IP-CAN. If the PCC rules are dependent on the access type of the IP-CAN, the PDN GW may contact the PCRF to obtain the modified PCC rules. The specific process is similar to that depicted in step 10.

14. The PDN GW may send back a Binding ACK message to the UE.

15. After the access network element of the Non-3GPP access network or the Non-3GPP GW receives a message indicating that the UE has switched to the destination access network, if the access network element of the Non-3GPP access network or the Non-3GPP GW identifies that the Pre-registration or Optimized Handover process has been performed for the UE, the access network element of the Non-3GPP access network or the Non-3GPP GW may send a Handover Complete message to the first network element at network side of the 3GPP network.

16. After receiving the Handover Complete message from the access network element of the Non-3GPP access network or the Non-3GPP GW, the first network element at network side of the 3GPP network may initiate a process for releasing resources in the source 3GPP access network, in other words, the process for releasing resources in the source 3GPP access network is triggered by the first network element at network side of the 3GPP network.

The first network element at network side of the 3GPP network may send a Delete Bearer Request message or a Delete PDP Context Request message to the Serving GW. The Delete Bearer Request message or the Delete PDP Context Request message may include a flag to indicate that this bearer deleting process is caused by handover from the 3GPP access network to the Non-3GPP access network. Specific measures for implementing the flag may be as follows.

(1) The flag may be a "Delete Type" flag. The first network element at network side of the 3GPP network may set the Delete Type flag as "inter RAT Handover from 3GPP to Non-3GPP".

(2) The flag may be a "Cause" value. The first network element at network side of the 3GPP network may set the Cause value as "inter RAT Handover from 3GPP to Non-3GPP".

(3) The flag may be an "INHI" flag.

17. If the PDN GW does not release the resources unless receiving a notification from the Serving GW, the Serving GW may send a Delete Bearer Request message (if the Serving GW and the PDN GW are interfaced using the GTP Protocol) or a Proxy Binding Update message (if the Serving GW and the PDN GW are interfaced using the PMIP Protocol) to the PDN GW. The Delete Bearer Request message or the Proxy Binding Update message may include a flag to indicate that this bearer deleting process is caused by handover from the 3GPP access network to the Non-3GPP access network. Specific measures for implementing the flag may be as follows.

(1) The flag may be a "Delete Type" or "Binding Type" flag. The Serving GW may set the Delete Type or Binding Type flag as "inter RAT Handover from 3GPP to Non-3GPP".

(2) The flag may be a "Cause" value. The Serving GW may set the Cause value as "inter RAT Handover from 3GPP to Non-3GPP".

(3) The flag may be an "INHI" flag.

18. After receiving the Delete Bearer Request message or the Proxy Binding Update message, the PDN GW may release the resources (e.g., Binding Cache entry resources (if the Serving GW and the PDN GW are interfaced using the PMIP protocol) or Bearer Context resources (if the Serving GW and the PDN GW are interfaced using the GTP protocol)) in the source 3GPP access network, and reserve the resources (e.g., Binding Cache entry resources in the Non-3GPP access network, IP address allocated by the PDN GW for the UE, and so on) in the destination Non-3GPP access network, without indicating the PCRF that the resources have been released.

The PDN GW may send back a Delete Bearer Response message or a Proxy Binding ACK message to the Serving GW.

19. The Serving GW may send back a Delete Bearer Response message or a Delete PDP Context Response message to the first network element at network side.

The following should be noted.

(1) Steps 6 and 7 are not necessarily performed in fixed order; instead, they may be performed in any order, so do steps 9 and 15.

(2) If no process type information of Registration Request is carried and the Non-3GPP GW obtains the PCC rules from the PCRF, the Non-3GPP GW may initiate a Dedicated Bearer Activation process at the network side according to the obtained PCC rules, to create the resources corresponding to the PCC rules, in other words, to create resources in the Non-3GPP system to be required for the services which are used by the UE in the source 3GPP access system.

(3) If no process type information of the Registration Request is conveyed to the PDN GW, the PDN GW may initiate a process for releasing resources in the source 3GPP access network (in other word, the process for releasing resources in the source 3GPP access network is triggered by the PDN GW), to release the resources in the source 3GPP access network.

Figure 10:
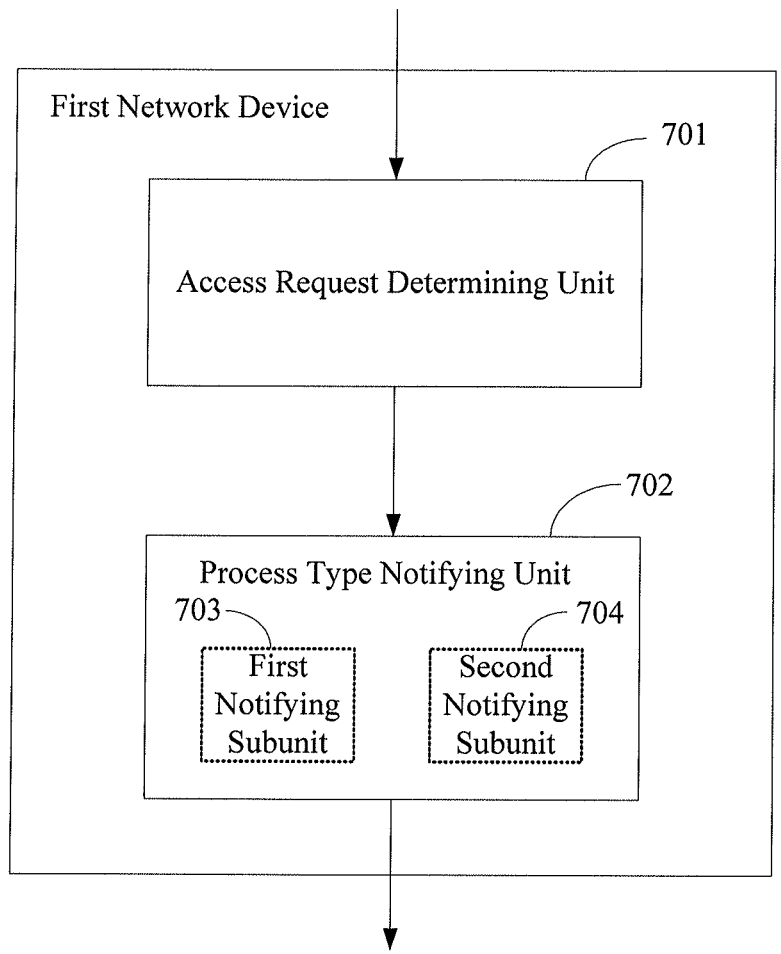
FIG. 10 is a block diagram illustrating a first network device according to an embodiment of the present invention.

In addition to the method for creating resources according to above embodiments of the present invention, network devices are provided in embodiments of the present invention. FIG. 10 is a block diagram illustrating the structure of a first network device according to an embodiment of the present invention. The first network device includes an access request determining unit 701 and a process type notifying unit 702.

The access request determining unit 701 is adapted to determine whether an access request initiated from a user equipment (UE) is an initial access request or a handover request between a Non-3GPP access system and a 3GPP access system, and send the determined result to the process type notifying unit 702.

The process type notifying unit 702 is adapted to receive the determined result from the access request determining unit 701, determine a process type for creating resources for the UE, and notify the process type to a network element at network side which is adapted to create the resources for the UE.

The process type notifying unit 702 may further include a first notifying subunit 703 and/or a second notifying subunit 704.

The first notifying subunit 703 is adapted to send a Create Bearer Request message, a Proxy Binding Update message, or a Binding Update message including a flag, which is used to indicate that the process type for creating bearer is a first/second creating type or indicate that the process type for updating binding is a first/second binding type.

The second notifying subunit 704 is adapted to send a specific message to request for creating resources to be required for services which are used by the UE in an access system before handover.

The first network device may be integrated into an MME, or an SGSN, or a Non-3GPP GW, or a UE in an evolved network.

Figure 11:
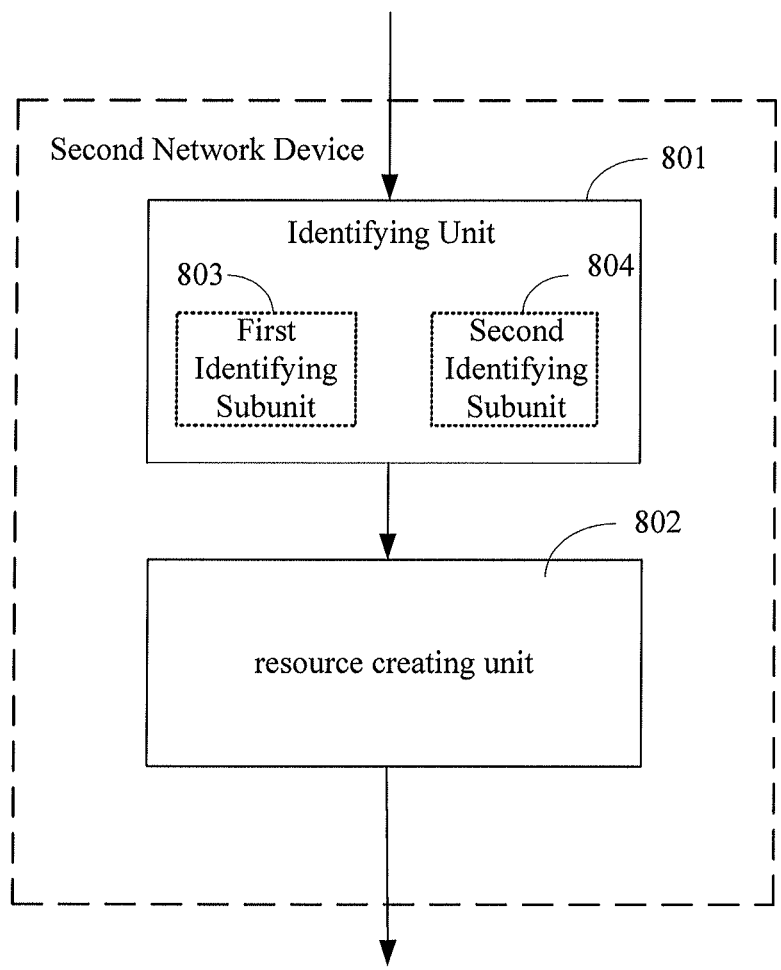
FIG. 11 is a block diagram illustrating a second network device according to an embodiment of the present invention.

FIG. 11 is a block diagram illustrating the structure of a second network device according to an embodiment of the present invention. The second network device includes an identifying unit 801 and resource creating unit 802.

The identifying unit 801 is adapted to identify a process type for creating resources for a UE from a received message, and notify the identified process type to the resource creating unit 802.

The resource creating unit 802 is adapted to receive the process type from the identifying unit 801, and create the resources for the UE according to the process type.

The identifying unit 801 may further include a first identifying subunit 803 and/or a second identifying subunit 804.

The first identifying subunit 803 is adapted to identify a flag included in a received Create Bearer Request message, a Proxy Binding Update message, or a Binding Update message, determine a first/second creating type or a first/second binding type according to the flag, and send the determined first/second creating type or first/second binding type to the resource creating unit 802.

The second identifying subunit 804 is adapted to identify a received specific message, which requests for creating resources to be required for services which are used by the UE in an access system before handover, and notify the resource creating unit 802 to create the resources to be required for the services which are used by the UE in the access system before handover.

The resource creating unit 802 is adapted to create a default bearer for the UE after receiving the first creating type or the first binding type from the first identifying subunit 803.

The resource creating unit 802 is adapted to create the resources to be required for the services which are used by the UE in the access system before handover, after receiving the second creating type or the second binding type from the first identifying subunit 803 or the notification from the second identifying subunit 804.

The second network device may be integrated into a PDN GW entity.

Embodiment 8

Figure 12:
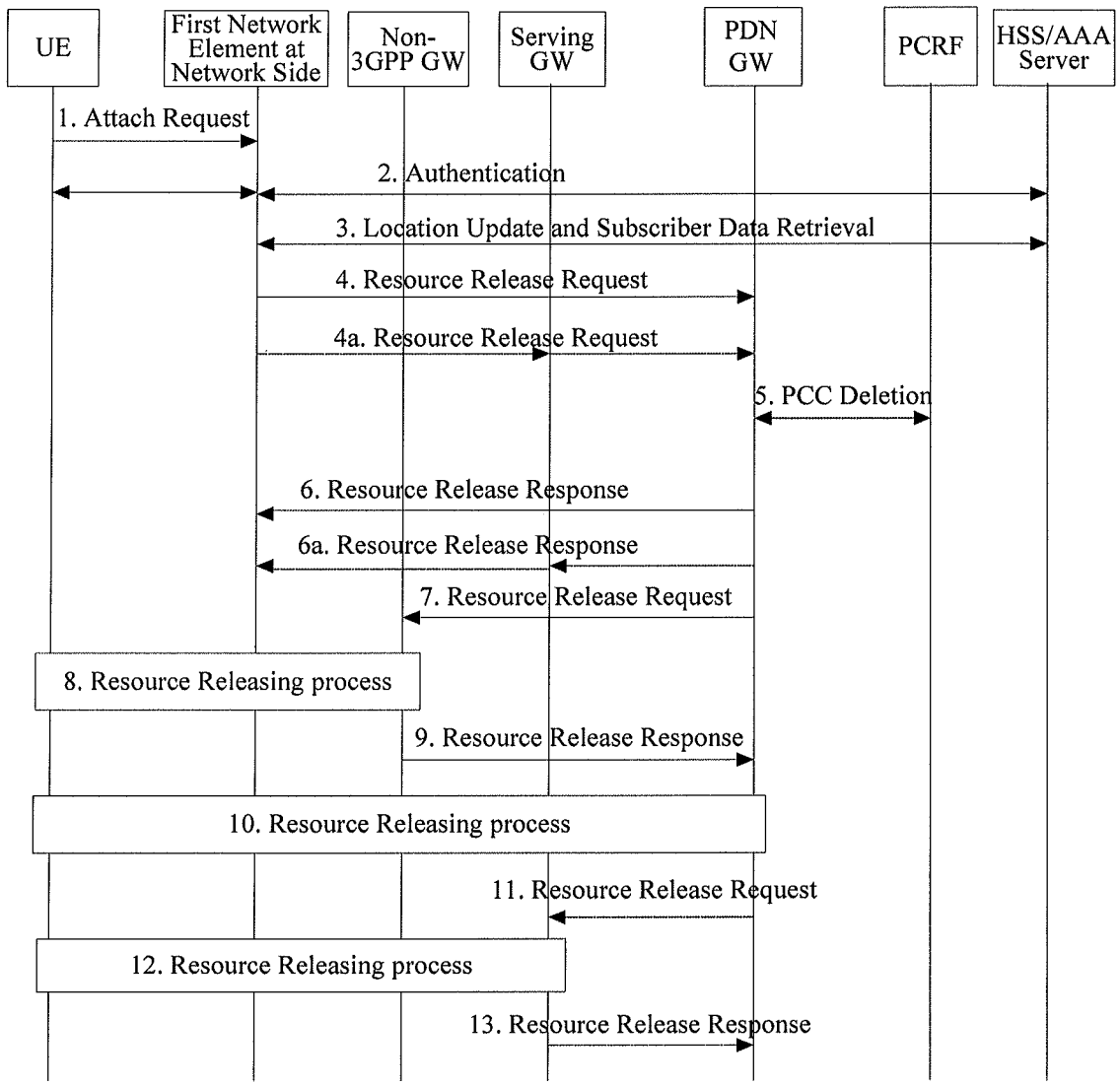
FIG. 12 is a flowchart illustrating a signaling interaction process for deleting resources according to an eighth embodiment of the present invention.

When an initial access to a 3GPP system is performed, a first network element at network side may obtain address information of PDN GWs used by a UE from an HSS, and then send a message to notify the PDN GWs to release resources used by the UE. The PDN GWs may release the resources used by the UE after receiving the message. FIG. 12 illustrates a specific process including the following steps.

1. A UE may send to a first network element at network side an Attach Request message for performing an initial access process. The first network element at network side may be an MME in an SAE system, and may be an SGSN in a GPRS/UMTS system.

2. An Authentication process may be performed among the UE, the first network element at network side, and an HSS/AAA Server.

3. A Location Update and Subscriber Data Retrieval process may be performed between the first network element at network side and the HSS/AAA Server. In this process, the first network element at network side may obtain the address information of the PDN GWs used by the UE in a Non-3GPP access system. Alternatively, the HSS/AAA Server may send to the first network element at network side the address information of the PDN GWs used by the UE in the Non-3GPP access system.

4. If the Attach process is an initial attach, after the first network element at network side obtains the address information of the PDN GWs used by the UE from the HSS, the first network element at network side may send a Resource Release Request message to these PDN GWs, requesting the PDN GWs to release resources used by the UE. An identifier of the UE, such as an International Mobile Subscriber Identity (IMSI) of a subscriber, may be included in the message.

4a. If there is no interface between the first network element at network side and the PDN GWs, the Resource Release Request message may be forwarded to the PDN GWs via a Serving GW. The first network element at network side may send to a selected Serving GW a Resource Release Request message, which includes the address information of the PDN GWs obtained by the first network element at network side from the HSS. Then Serving GW may send to each PND GW a Resource Release Request message which includes the identifier of the UE, such as the IMSI of the UE.

5. The PDN GWs each may inquire whether PCC rules for the UE exist in the PDN GW itself. If the PCC rules for the UE exist in the PDN GW itself, the PDN GW may delete the stored PCC rules for the UE while notifying a PCRF to delete stored PCC rules for the UE. The specific process is similar to that depicted in the first embodiment.

6. The PDN GWs may send back a Resource Release Response message to the first network element at network side.

6a. If there is no interface between the first network element at network side and the PDN GWs, the Resource Release Response message may be forwarded to the first network element at network side via the Serving GW.

7. If the network where the UE was located previously is a Non-3GPP network, the PDN GWs may send to a Non-3GPP GW a Resource Release Request message for releasing resources allocated to the UE by the Non-3GPP network. The Non-3GPP GW is an EPDG in a WLAN system, is an ASN GW in a Wimax system, and is an AGW in a CDMA system.

8. The Non-3GPP GW may initiate a Resource Releasing process for releasing the resources allocated to the UE by the Non-3GPP network.

9. The Non-3GPP GW may send back a Resource Release Response message to the PDN GWs. The PDN GWs may release the resources allocated to the UE.

10. If the network where the UE was located previously is a 3GPP network and the Serving GW and the PDN GWs are interfaced using the GTP protocol, the PDN GWs may initiate a Resource Releasing process for releasing the resources allocated to the UE by the 3GPP network.

11. If the network where the UE was located previously is a 3GPP network and the Serving GW and the PDN GWs are interfaced using the PMIP protocol, the PDN GWs may send to the Serving GW a Resource Release Request message, for requesting the 3GPP network to release the resources allocated to the UE.

12. The Serving GW may initiate a Resource Releasing process for releasing the resources allocated to the UE by the 3GPP network 13. The Serving GW may send back a Resource Release Response message to the PDN GWs. The PDN GWs may release the resources allocated to the UE.

The following should be noted.

(1) If the Serving GW and the PDN GWs are implemented at a same entity, the messages between the Serving GW and the PDN GWs become internal messages at the entity.

(2) Steps 6 and 7 are not necessarily performed in a fixed order; instead, they may be performed in any order.

Embodiment 9

Figure 13:
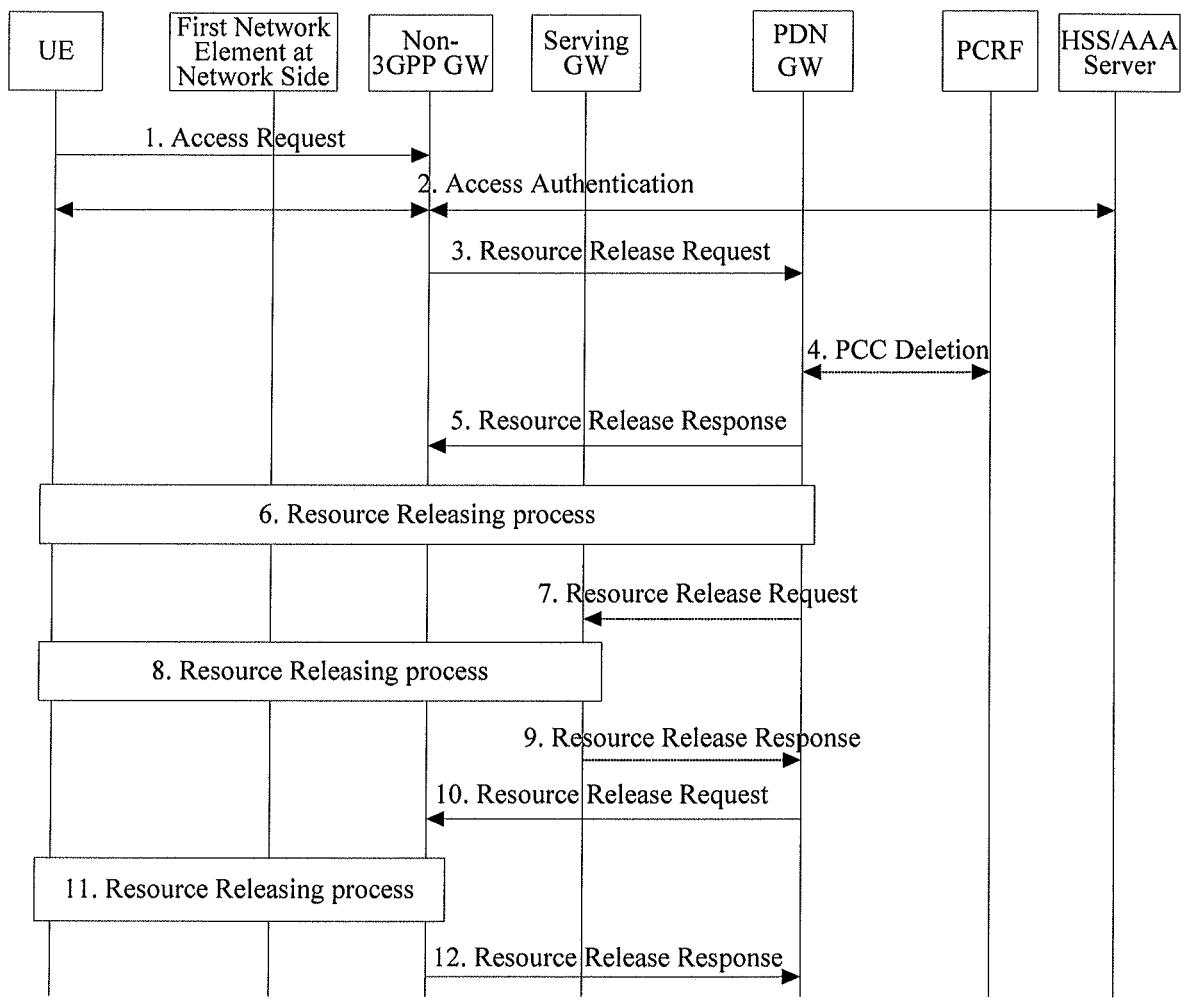
FIG. 13 is a flowchart illustrating a signaling interaction process for deleting resources according to a ninth embodiment of the present invention.

When an initial access to a Non-3GPP system is performed, a first network element at network side may obtain address information of the PDN GWs used by a UE from an HSS, and then send a message to notify the PDN GWs to release resources used by the UE. The PDN GWs may release the resources used by the UE after receiving the message. FIG. 13 illustrates a specific process including the following steps.

1. A UE may send to a Non-3GPP GW an Access Request message for performing an initial access to a Non-3GPP system. The Non-3GPP GW may be an EPDG in a WLAN system, may be an ASN GW in a Wimax system, and may be an AGW in a CDMA system.

2. An authentication process may be performed among the UE, the Non-3GPP GW, and an HSS/AAA Server. In this process, the Non-3GPP GW may obtain address information of the PDN GWs used by the UE, or the HSS/AAA Server may send to the Non-3GPP GW the address information of the PDN GWs used by the UE in a 3GPP access system.

3. If the Access process is an initial access, after the Non-3GPP GW obtains the address information of the PDN GWs used by the UE from an HSS, the Non-3GPP GW may send a Resource Release Request message to these PDN GWs, requesting the PDN GWs to release resources used by the UE. An identifier of the UE, such as an IMSI of the subscriber, may be included in the message.

4. The PDN GWs each may inquire whether PCC rules for the UE exist in the PDN GW itself. If the PCC rules for the UE exist in the PDN GW itself, the PDN GW may delete the PCC rules for the UE while notifying a PCRF to delete stored PCC rules for the UE.

5. The PDN GWs may send back a Resource Release Response message to the Non-3GPP GW.

6. If the network where the UE was located previously is a 3GPP network and the Serving GW and the PDN GWs are interfaced using the GTP protocol, the PDN GWs may initiate a Resource Releasing process for releasing the resources allocated to the UE by the previous network.

7. If the network where the UE was located previously is a 3GPP network and the Serving GW and the PDN GWs are interfaced using the PMIP protocol, the PDN GWs may send to the Serving GW a Resource Release Request message, for requesting the 3GPP network to release the resources allocated to the UE.

8. The Serving GW may initiate a Resource Releasing process for releasing the resources allocated to the UE by the 3GPP network.

9. The Serving GW may send back a Resource Release Response message to the PDN GWs. The PDN GWs may release the resources allocated to the UE.

10. If the network where the UE was located previously is a Non-3GPP network, the PDN GWs may send to the Non-3GPP GW a Resource Release Request message for releasing the resources allocated to the UE by the Non-3GPP network. The Non-3GPP GW may be an EPDG in a WLAN system, may be an ASN GW in a Wimax system, and may be an AGW in a CDMA system.

11. The Non-3GPP GW may initiate a Resource Releasing process for releasing the resources allocated to the UE by the Non-3GPP network.

12. The Non-3GPP GW may send back a Resource Release Response message to the PDN GWs. The PDN GWs may release the resources allocated to the UE.

Figure 14:
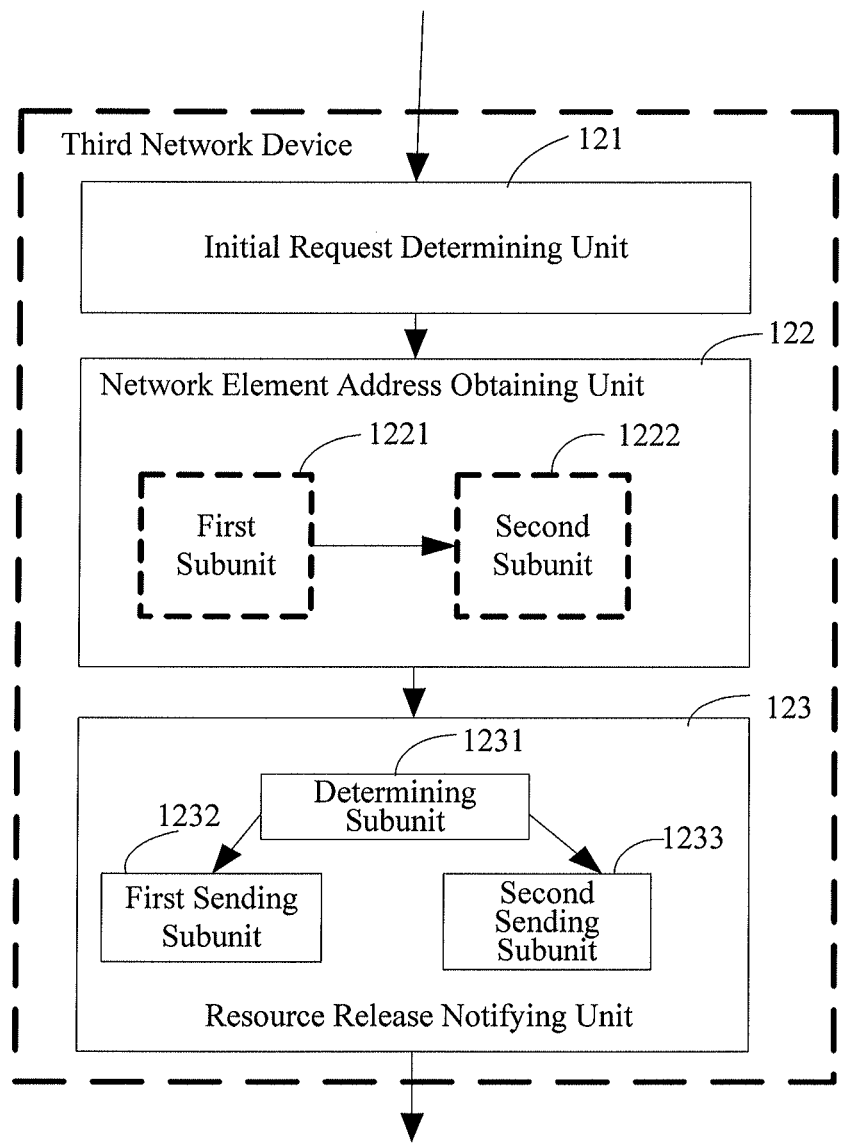
FIG. 14 is a block diagram illustrating a third network device according to an embodiment of the present invention.

In addition to the method for deleting resources according to above embodiments of the present invention, network devices are provided in embodiments of the present invention. FIG. 14 is a block diagram illustrating the structure of a third network device according to an embodiment of the present invention. The third network device includes an initial request determining unit 121, a network element address obtaining unit 122, and a resource release notifying unit 123.

The initial request determining unit 121 is adapted to determine that an access request initiated by a User Equipment (UE) is an initial access request, and notify the determined result to the network element address obtaining unit 122.

The network element address obtaining unit 122 is adapted to obtain address information of an Anchor GW used by the UE, and send the address information to the resource release notifying unit 123.

The resource release notifying unit 123 is adapted to send a Resource Release Notification message to the Anchor GW according to the address information received from the network element address obtaining unit 122, to request to release resources allocated to the UE.

The network element address obtaining unit 122 may further include a first subunit 1221 and/or a second subunit 1222.

The first subunit 1221 is adapted to obtain the address information of the Anchor GW used by the UE from an HSS of the UE, and send the address information of the Anchor GW to the second subunit 1222.

The second subunit 1222 is adapted to store the address information of the Anchor GW and send the address information of the Anchor GW to the resource release notifying unit 123.

The resource release notifying unit 123 may further include a determining subunit 1231, a first sending subunit 1232, and a second sending subunit 1233.

The determining subunit 1231 is adapted to determine whether an interface exists between the third network device and the Anchor GW, notify the first sending subunit 1232 to send the Resource Release Notification message to the Anchor GW if the interface exists, and notify the second sending subunit 1233 to send the Resource Release Notification message to a Serving GW, which forwards the Resource Release Notification message to the Anchor GW, if the interface does not exist.

The first sending subunit 1232 is adapted to send the Resource Release Notification message to the Anchor GW.

The second sending subunit 1233 is adapted to send the Resource Release Notification message to the Serving GW.

Figure 15:
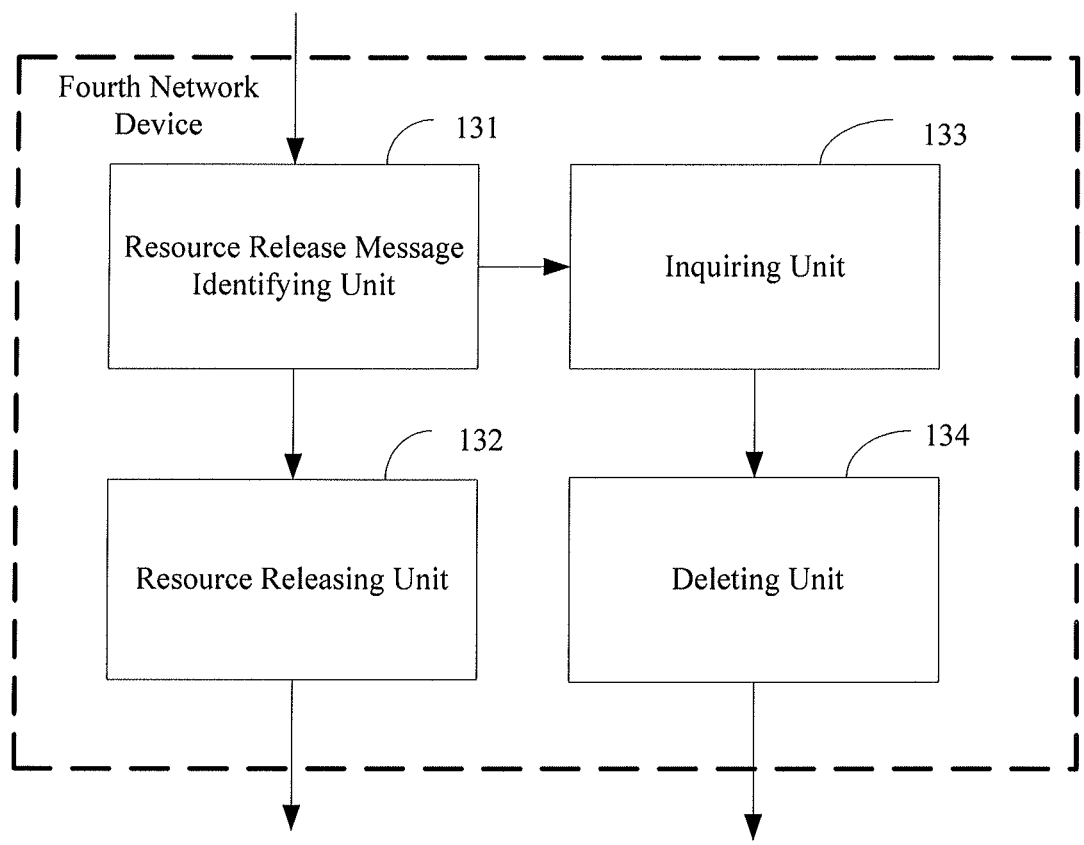
FIG. 15 is a block diagram illustrating a fourth network device according to an embodiment of the present invention.

FIG. 15 is a block diagram illustrating the structure of a fourth network device according to an embodiment of the present invention. The fourth network device includes a Resource Release message identifying unit 131 and a resource releasing unit 132.

The Resource Release message identifying unit 131 is adapted to identify a received Resource Release Notification message, and send the message to the resource releasing unit 132.

The resource releasing unit 132 is adapted to release resources allocated to a UE.

The fourth network device may further include an inquiring unit 133 and a deleting unit 134.

The Resource Release message identifying unit 131a is further adapted to send the identified Resource Release Notification message to the inquiring unit 133 after the Resource Release Notification message is identified.

The inquiring unit 133 is adapted to inquire whether PCC rules for the UE are stored locally, and notify the inquiry result to the deleting unit 134 if the PCC rules for the UE are stored locally.

The deleting unit 134 is adapted to delete the locally stored PCC rules for the UE, and notify a network-side PCRF to delete corresponding stored rules.

The fourth network device may be integrated into an Anchor PDN GW.

In summary, in a method for creating resources according to embodiments of the present invention, a first network element may notify a second network element at network side of a process type for creating resources for a UE, and the second network element at network side may perform a resource creating process for the UE according to the process type. Also provided is a method for deleting resources, a first network element at network side may obtain address information of the second network element at network side used by a UE from a network element on which the address information of the second network element at network side is stored, and send a message to notify the obtained second network element at network side to release resources, and the second network element at network side may release the resources. In this way, a problem in the prior art that the network element at network side (i.e., the second network element at network side) cannot differentiate different access requests (i.e., initial access request and access request caused by handover between access systems) and thus corresponding resources cannot be created with respect to different access requests may be overcome, and a problem of deleting resources at the time of initial access may be overcome.

It should be understood for ordinary skilled persons in the art that all or part of the processes in the methods according to embodiments of the present invention may be implemented by software, hardware, or a combination of software and hardware though programs. The programs may be stored on a computer readable storage medium, and may be executed to perform the processes in the methods of the embodiments. The storage medium may be a magnetic disk, a compact disk (CD), a read-only memory (ROM), a random access memory (RAM), and so on.

It is apparent for those skilled in the art that any modification, variation, and substitution may be made to the illustrated embodiments without departing from the spirit and scope of the present invention. Thus the present invention should not be limited by any of the above-described exemplary embodiments, but should be defined only in accordance with the following claims and their equivalents.

What is claimed is:

1. A method comprising:
    during a procedure in which a terminal device is handed over from a non-3$^{rd}$ generation partnership project (non-3GPP) access system to a 3GPP access system, receiving, by a serving gateway (Serving GW), a first message comprising handover indication information from a mobility management network device, wherein the handover indication information indicates a handover access type of the terminal device other than an initial access to the 3GPP access system;
    sending, by the Serving GW, a second message comprising the handover indication information to a packet data network gateway (PDN GW); and
    in response to the handover indication information, obtaining, by the PDN GW, one or more modified policy and charging control (PCC) rules from a policy and charging rules function (PCRF) by using a modification procedure, wherein the one or more modified PCC rules are applied to a service to be used by the terminal device in the 3GPP access system.

2. The method of claim 1, wherein the first message is a first Create Default Bearer Request message and the second message is a second Create Default Bearer Request message.

3. The method of claim 1, wherein the non-3GPP access system is one of:
    a Code Division Multiple Access (CDMA) access system;
    a Wireless Local Area Network (WLAN) access system; or
    a Worldwide Interoperability for Microwave Access (WiMAX) access system.

4. The method of claim 1, wherein the 3GPP access system is a System Architecture Evolution (SAE) access system.

5. The method of claim 1, wherein each of the first and second messages is a Create Default PDP Context Request message.

6. The method according to claim 1, further comprising:
    receiving, by the mobility management network device, an access request indicating the handover access type.

7. The method of claim 1, further comprising:
    initiating, by the PDN GW, a process for activating a dedicated bearer according to the one or more modified PCC rules.

8. The method of claim 7, wherein the dedicated bearer is activated for a service to be used by the terminal device in the non-3GPP access system.

9. The method of claim 7, further comprising:
    initiating, by the PDN GW, a process for releasing a resource used by the terminal in the non-3GPP access system.

10. The method of claim 1, wherein the modification procedure is an IP-CAN Session Modification procedure.

11. A method comprising:
    during a procedure in which a terminal device is handed over from a non-3$^{rd}$ generation partnership project (non-3GPP) access system to a 3GPP access system, sending, by a mobility management network device to a first anchor, a first message comprising handover indication information, wherein the handover indication information indicates a handover access type of the terminal device other than an initial access to the 3GPP access system;
    sending, by the first anchor to a second anchor, a second message including the handover indication information upon receiving the first message; and
    obtaining, by the second anchor according to the handover access type, one or more policy and charging control (PCC) rules applied to a service to be used by the terminal device in the 3GPP access system by using a modification procedure.

12. The method of claim 11, further comprising:
    receiving, by the mobility management network device, an access request including the handover indication information prior to sending the first message.

13. The method of claim 11, wherein the first message is a first Create Default Bearer Request message and the second message is a second Create Default Bearer Request message.

14. The method of claim 13, further comprising:
    receiving, by the mobility management network device, an attach request indicating the handover access type prior to sending the first Create Default Bearer Request message.

15. The method of claim 11, wherein the first message is a first Create Default PDP Context Request message and the second message is a second Create Default PDP Context Request message.

16. The method of claim 11, wherein:
    the 3GPP access system is an evolved Universal Mobile Telecommunications System Terrestrial Radio Access Network (E-UTRAN), the mobility management network device is a Mobility Management Entity (MME), the first anchor is a serving gateway (Serving GW), and the second anchor is a packet data network gateway (PDN GW).

17. The method of claim 11, wherein obtaining the one or more PCC rules comprises:
    obtaining, by the second anchor, the one or more PCC rules from a Policy and Charging Rules Function (PCRF) by using a PCC modification procedure.

18. The method of claim 11, wherein obtaining the one or more PCC rules comprises:
    obtaining, by the second anchor, the one or more PCC rules stored in the second anchor.

19. The method of claim 11, further comprising:
    initiating, by the second anchor, a dedicated bearer activation process according to the one or more PCC rules.

20. A communication system, comprising:
    a mobility management network device, a first anchor and a second anchor;
    wherein:
    the mobility management network device is configured to send a first message to the first anchor during a procedure in which a terminal device is handed over from a non-3$^{rd}$ Generation Partnership Project (non-3GPP) access system to a 3GPP access system, wherein the first message comprises handover indication information indicating a handover access type of the terminal device other than an initial access to the 3GPP access system;
    the first anchor is configured to receive the first message and send a second message including the handover indication information to the second anchor; and
    the second anchor is configured to receive the second message and obtain, according to the handover access type by using a modification procedure, one or more policy and charging control (PCC) rules applied to a service to be used by the terminal device in the 3GPP access system.

21. The communication system of claim 20, wherein the first message is a first Create Default Bearer Request message and the second message is a second Create Default Bearer Request message.

22. The communication system of claim 21, wherein the mobility management network device is further configured to receive an attach request indicating the handover access type prior to sending the first message.

23. The communication system of claim 20, wherein the first message is a first Create Default PDP Context Request message, the second message is a second Create Default PDP Context Request message.

24. The communication system of claim 20, wherein the mobility management network device is further configured to receive an attach request indicating the handover access type prior to sending the first message.

25. The communication system of claim 20, wherein:
the 3GPP access system is an evolved Universal Mobile Telecommunications System Terrestrial Radio Access Network (E-UTRAN), the mobility management network device is a Mobility Management Entity (MME), the first anchor is a Serving Gateway (Serving GW), and the second anchor is a packet data network gateway (PDN GW).

26. The communication system of claim 25, wherein the Serving GW and the PDN GW are integrated.

27. The communication system of claim 20, wherein the second anchor is configured to obtain the one or more PCC rules from a Policy and Charging Rules Function (PCRF).

28. The communication system of claim 20, wherein the second anchor is configured to obtained the one or more PCC rules stored in the second anchor.

29. The system of claim 20, wherein the second anchor is further configured to initiate a dedicated bearer activation process according to the one or more PCC rules.

30. A system, comprising:
a serving gateway (Serving GW), and a packet data network gateway (PDN GW);
wherein the Serving GW is configured to:
receive a first message comprising handover indication information from a mobility management network device during a procedure in which a terminal device is handed over from a non-3$^{rd}$ generation partnership project (non-3GPP) access system to a 3GPP access system, wherein the handover indication information indicates a handover access type of the terminal device other than an initial access to the 3GPP access system; and
send a second message comprising the handover indication information to the PDN GW;
wherein the PDN GW is configured to:
in response to the handover indication information, obtain one or more modified policy and charging control (PCC) rules from a policy and charging rules function (PCRF) by using a modification procedure, wherein the one or more modified PCC rules are applied to a service to be used by the terminal device in the 3GPP access system.

31. The system according to claim 30, wherein each of the first and second messages is a Create Default Bearer Request message.

32. The system according to claim 30, wherein the non-3GPP access system is one of:
a Code Division Multiple Access (CDMA) access system;
a Wireless Local Area Network (WLAN) access system; or a Worldwide Interoperability for Microwave Access (WiMAX) access system.

33. The system according to claim 30, wherein the 3GPP access system is a System Architecture Evolution (SAE) access system.

34. The system according to claim 30, wherein each of the first and second messages is a Create Default PDP Context Request message.

35. The system according to claim 30, wherein the PDN GW is further configured to initiate a process for activating a dedicated bearer according to the one or more modified PCC rules.

36. The system according to claim 30, wherein the modification procedure is an IP-CAN Session Modification procedure.

37. The system according to claim 30, further comprising:
the mobility management network device, configured to receive an access request indicating the handover access type.

* * * * *